(12) United States Patent
Jiang

(10) Patent No.: US 10,547,383 B2
(45) Date of Patent: Jan. 28, 2020

(54) INFORMATION TRANSMISSION METHOD, COORDINATOR, AND TERMINAL NODE IN OPTICAL WIRELESS COMMUNICATIONS NETWORK

(71) Applicant: Huawei Technologies Co., Ltd., Shenzhen (CN)

(72) Inventor: Tong Jiang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/171,997

(22) Filed: Oct. 26, 2018

(65) Prior Publication Data
US 2019/0068281 A1    Feb. 28, 2019

Related U.S. Application Data

(63) Continuation of application No. PCT/CN2016/080362, filed on Apr. 27, 2016.

(51) Int. Cl.
*H04B 10/11*    (2013.01)
*H04B 10/116*    (2013.01)
(Continued)

(52) U.S. Cl.
CPC ........... *H04B 10/116* (2013.01); *H04B 10/11* (2013.01); *H04B 10/40* (2013.01);
(Continued)

(58) Field of Classification Search
CPC ... H04B 10/116; H04B 10/40; H04W 74/085; H04W 72/0453
See application file for complete search history.

(56) References Cited

U.S. PATENT DOCUMENTS 8,565,612 B2    10/2013    Kim et al.
2011/0243570 A1    10/2011    Kim et al.
(Continued)

FOREIGN PATENT DOCUMENTS

CN    200947602 Y    9/2007
CN    102835043 A    12/2012
(Continued)

OTHER PUBLICATIONS

Yiyang Li, et al, "UVOC-MAC: A MAC Protocol for Outdoor Ultraviolet Networks," IEEE, The 18th IEEE International Conference on Network Protocols (ICNP), Oct. 5, 2010, pp. 72-81, XP031864716.
(Continued)

*Primary Examiner* — Dzung D Tran
(74) *Attorney, Agent, or Firm* — Conley Rose, P.C.

(57) ABSTRACT

Embodiments of the present application provide an information transmission method, a coordinator, and a terminal node in an optical wireless communications network. The method includes: receiving a request to send (RTS) frame sent by a sending node by using a first bandwidth, wherein the RTS frame comprises first indication information; determining a second bandwidth based on the first indication information, wherein the second bandwidth is a sending bandwidth used when the sending node sends to-be-sent information and a receiving bandwidth used when the receiving node receives the to-be-sent information; and sending a clear to send (CTS) frame to the sending node by using a third bandwidth.

20 Claims, 6 Drawing Sheets

(51) Int. Cl.
  *H04B 10/40* (2013.01)
  *H04W 72/12* (2009.01)
  *H04W 74/08* (2009.01)
  *H04W 74/04* (2009.01)

(52) U.S. Cl.
  CPC ..... *H04W 72/1289* (2013.01); *H04W 74/085* (2013.01); *H04W 74/04* (2013.01)

(56) References Cited

U.S. PATENT DOCUMENTS

| | | | |
|---|---|---|---|
| 2012/0243485 A1 | 9/2012 | Merlin et al. | |
| 2016/0360528 A1 | 12/2016 | Kim et al. | |
| 2018/0054810 A1* | 2/2018 | Shinohara | H04W 72/04 |
| 2018/0124746 A1* | 5/2018 | Choi | H04W 72/04 |
| 2018/0146478 A1* | 5/2018 | Kim | H04W 76/14 |
| 2018/0310330 A1* | 10/2018 | Chun | H04L 5/0053 |
| 2018/0343096 A1* | 11/2018 | Kim | H04W 52/243 |

FOREIGN PATENT DOCUMENTS

| | | |
|---|---|---|
| CN | 103199922 A | 7/2013 |
| CN | 103220760 A | 7/2013 |
| CN | 104883711 A | 9/2015 |
| EP | 3107223 A1 | 12/2016 |
| JP | 2004364069 A | 12/2004 |
| JP | 2013541293 A | 11/2013 |
| WO | 2015119374 A1 | 8/2015 |

OTHER PUBLICATIONS

Sina Asadallahi, et al, "Performance Comparison of CSMA/CA Advanced Infrared (AIr) and a New Point-to-Multipoint Optical MAC Protocol," IEEE, 2012 8th International Wireless Communications and Mobile Computing Conference (IWCMC), Aug. 27, 2012, pp. 1149-1153, XP032253462.
Imamura Yusuke, et al, "Local Area Network Using RTS/CTS in VLC," IEEE, 2014 9th International Symposium on Communication Systems, Networks & Digital Sign (CSNDSP), Jul. 23, 2014, pp. 910-913, XP032660706.
Parth H. Pathak, et al, "Visible Light Communication, Networking, and Sensing: A Survey, Potential and Challenges," IEEE Communications Surveys & Tutorials, vol. 17, No. 4, pp. 2047-2077, XP011590623.
Dr. Nikola Serafimovski, "pureLiFi 802.15.7r1 proposal for High Speed PD OWC communications", pureLiFi Ltd., IEEE 802.15-15-16-0004-00-007a, Jan. 2016, 44 pages.
TG7r1, "Proposal for TG7r1 High-rate PD Communications", IEEE P802.15-15-0293-03-007a, Jan. 10, 2016, 21 pages.
"IEEE Standard for Local and metropolitan area networks—Part 15.7: Short-Range Wireless Optical Communication Using Visible Light", IEEE Std 802.15.7™ 2011, Sep. 6, 2011, 309 pages.
Machine Translation and Abstract of Chinese Publication No. CN103199922, Jul. 10, 2013, 14 pages.
Machine Translation and Abstract of Chinese Publication No. CN103220760, Jul. 24, 2013, 17 pages.
Machine Translation and Abstract of Chinese Publication No. CN200947602, Sep. 12, 2007, 10 pages.
Foreign Communication From a Counterpart Application, Chinese Application No. 201680085017.9, Chinese Office Action dated Oct. 28, 2019, 7 pages.
Machine Translation and Abstract of Japanese Publication No. JP2004364069, Dec. 24, 2004, 33 pages.
Foreign Communication From a Counterpart Application, Japanese Application No. 2018-556426, Japanese Office Action dated Nov. 5, 2019, 3 pages.
Foreign Communication From a Counterpart Application, Japanese Application No. 2018-556426, English Translation of Japanese Office Action dated Nov. 5, 2019, 4 pages.

* cited by examiner

INFORMATION TRANSMISSION METHOD, COORDINATOR, AND TERMINAL NODE IN OPTICAL WIRELESS COMMUNICATIONS NETWORK

CROSS-REFERENCE TO RELATED APPLICATIONS

This application is a continuation of International Application No. PCT/CN2016/080362 filed on Apr. 27, 2016, the disclosure of which is hereby incorporated by reference in its entirety.

TECHNICAL FIELD

Embodiments of the present application relate to the communications field, and more specifically, to an information transmission method, a coordinator, a terminal node, a receiving node, and a sending node in an optical wireless communications network.

BACKGROUND

Optical wireless communications (OWC) refers to all optical communication in which no cables (for example, fibers) are used. Visible light communication (VLC), infrared communication, and the like are all communication manners in the optical wireless communications. The VLC is a manner of communication by using visible light spectra (380 nm to 780 nm). In the VLC, a signal is transmitted mainly by modulating intensity of a light emitting diode (LED) light source. At an input end, a transmitter encodes and modulates a to-be-transmitted data signal, where the encoded and modulated data signal is used to modulate intensity of an LED light source, to generate a light intensity modulation signal. At a receive end, a photodetector or an optical camera (OC) is used to detect the received light intensity modulation signal, convert the received light intensity modulation signal into an electrical signal, and input the converted electrical signal into a receiver. The receiver demodulates and decodes the electrical signal, and restores and outputs the transmitted data signal.

The Institute of Electrical and Electronics Engineers (IEEE) released the IEEE 802.15.7 standard in 2011. The standard is applicable to visible light communication. An IEEE 802.15.7 network is referred to as a visible light communication personal area network (VPAN). Each star VPAN has a serving node and a plurality of terminal nodes. The serving node is referred to as a coordinator (coordinator), configured to manage running of the VPAN.

In an OWC network, a coordinator may perform network resource and transmission scheduling based on a superframe or a Media Access Control (MAC) cycle. A superframe includes an active period and an inactive period. The active period includes a beacon timeslot used for sending a beacon, a contention access period (CAP), and a contention free period (CFP). Each MAC cycle may be divided into a contention-free transmission opportunity (CFTXOP) and a shared transmission opportunity (STXOP). The STXOP may include a contention-free timeslot (CFTS) and a contention-based timeslot (CBTS).

In the VPAN, when the coordinator communicates with a terminal node in a CAP or a CBTS, the communication may be performed in a carrier sense multiple access with collision avoidance (CSMA/CA) manner. In the CSMA/CA manner, the terminal node first listens to a channel, determines whether there is another terminal node using the channel (transmission is being performed), and if detecting that the channel is idle, sends data after waiting a period of time. If the terminal node finds, through listening, that the channel is being used, the terminal node uses a random backoff algorithm. A backoff counter counts down provided that the channel is idle. When the backoff counter is decremented to 0, the terminal node performs sending and waits for confirmation.

In uplink communication, because contention-based transmission is performed in the CSMA/CA manner, the coordinator does not know in advance which terminal node can successfully contend for a channel, and does not know a sending bandwidth used when the terminal node performs transmission. In this case, if a plurality of terminal nodes support different bandwidths, the coordinator does not know to use which bandwidth for signal receiving and processing.

SUMMARY

This application provides an information transmission method, a coordinator, a terminal node, a receiving node, and a sending node in an optical wireless communications network, so that when terminal nodes that may support different bandwidths contend for transmission, the coordinator can determine receiving bandwidths, so as to correctly detect uplink information.

According to a first aspect, this application provides an information transmission method in an optical wireless communications OWC network. The method includes: determining, by a coordinator, bandwidth information, where the bandwidth information includes bandwidth information of each of M terminal nodes, the M terminal nodes are associated with the coordinator, and M is an integer greater than or equal to 1; determining, by the coordinator, N contention-based transmission time periods, and determining, based on the bandwidth information, N transmission bandwidths in a one-to-one correspondence with the N contention-based transmission time periods, where N is an integer greater than 1; and sending, by the coordinator, scheduling information to the M terminal nodes, where the scheduling information is used to indicate the N transmission bandwidths and a correspondence, and the correspondence is the correspondence between the N transmission bandwidths and the N contention-based transmission time periods.

In this embodiment of the present application, the coordinator determines the correspondence between the contention-based transmission time periods and the transmission bandwidths based on the bandwidth information, so that when the terminal node transmits information in a contention-based transmission time period, the coordinator can receive information by using a corresponding bandwidth in the contention-based transmission time period. In addition, during downlink transmission, the terminal node can correctly detect downlink information based on the correspondence between the contention-based transmission time periods and the transmission bandwidths.

In addition, in this embodiment of the present application, a same transmission bandwidth or different transmission bandwidths may be set for different contention-based transmission time periods, so that during uplink communication contention, terminal nodes operating at different bandwidths perform transmission based on capabilities of the terminal nodes, thereby avoiding a waste of bandwidth resources caused by various terminal nodes using a minimum bandwidth for communication in the prior art.

In a possible implementation, the N contention-based transmission time periods are N time periods in a contention access period CAP.

In the OWC network, when communication is performed based on a structure of a superframe, the coordinator may divide a part or all of the CAP into the N time periods, and may determine a sending bandwidth of the terminal node in each time period by determining the one-to-one correspondence between the N time periods and the N transmission bandwidths, to determine a receiving bandwidth.

In a possible implementation, the N contention-based transmission time periods are N contention-based timeslots CBTSs in a Media Access Control MAC cycle.

In the OWC network, when communication is performed based on the MAC cycle, the coordinator may set a correspondence between the CBTSs and the transmission bandwidths. In this way, when the terminal node transmits information, the coordinator can know a sending bandwidth of the terminal node based on a time synchronized with that of the terminal node, to determine a receiving bandwidth.

In a possible implementation, the sending, by the coordinator, scheduling information to the M terminal nodes includes: sending, by the coordinator, a beacon frame to the M terminal nodes, where the beacon frame carries the scheduling information.

In a possible implementation, the sending, by the coordinator, scheduling information to the M terminal nodes includes: sending, by the coordinator, a Media Access Plan (MAP) frame to the M terminal nodes, where the MAP frame carries the scheduling information.

In a possible implementation, the bandwidth information includes a maximum bandwidth supported by each of the M terminal nodes and/or a bandwidth currently used by each of the M terminal nodes.

In a possible implementation, the bandwidth information further includes a maximum bandwidth supported by the coordinator and/or a bandwidth currently used by the coordinator.

In a possible implementation, the N transmission bandwidths include a maximum bandwidth supported by each of the M terminal nodes, or the N bandwidths include a bandwidth currently used by each of the M terminal nodes.

In a possible implementation, the N bandwidths further include a first bandwidth and/or a second bandwidth, the first bandwidth is a minimum bandwidth supported by a physical layer PHY mode, and the second bandwidth is a maximum bandwidth supported by the PHY mode.

In a possible implementation, the determining, by the coordinator, N contention-based transmission time periods includes:

determining, by the coordinator, the N contention-based transmission time periods based on a total traffic volume of the OWC network, a traffic volume of each of the M terminal nodes, and the bandwidth information.

In a possible implementation, the method further includes: sending, by the coordinator, indication information to each of the M terminal nodes, where the indication information is used to indicate each of the M terminal nodes to perform transmission with the coordinator based on the scheduling information in the N contention-based transmission time periods.

The coordinator may indicate, by using the indication information, to perform transmission between the terminal node and the coordinator based on the scheduling information. In this way, when the terminal node performs transmission after successfully contending for a channel, the coordinator can determine the receiving bandwidth based on the correspondence between the transmission bandwidths and the contention-based transmission time periods.

In a possible implementation, when the N contention-based transmission time periods are the N time periods in the CAP, a time length t(i) of an $i^{th}$ time period in the N time periods is:

$$t(i) = \frac{\Sigma M(i)}{M} t_{CAP1}, i = 1, 2, \cdots N,$$

where $\Sigma M(i)$ represents a quantity of terminal nodes, in the M terminal nodes, corresponding to a bandwidth M(i) corresponding to the $i^{th}$ time period, and $t_{CAP1}$ represents a time length corresponding to a part or all of the CAP.

In a possible implementation, the beacon frame may carry a start time and an end time of each of the N contention-based transmission time periods and a transmission bandwidth corresponding to each contention-based transmission time period.

In a possible implementation, the beacon frame may alternatively carry a start time of each of the N contention-based transmission time periods, duration corresponding to each contention-based transmission time period, and a transmission bandwidth corresponding to each contention-based transmission time period.

According to a second aspect, this application provides an information transmission method in an optical wireless communications OWC network. The method includes: receiving, by a terminal node, scheduling information sent by a coordinator, where the scheduling information is used to indicate N transmission bandwidths and a correspondence, the correspondence is a correspondence between the N transmission bandwidths and N contention-based transmission time periods, the N transmission bandwidths are in a one-to-one correspondence with the N contention-based transmission time periods, and N is an integer greater than 1; and perform, by the terminal node, information transmission with the coordinator in one or more of the N contention-based transmission time periods based on the scheduling information.

In this embodiment of the present application, the coordinator determines the correspondence between the contention-based transmission time periods and the transmission bandwidths, so that when the terminal node transmits information in a contention-based transmission time period, the coordinator can receive information by using a corresponding bandwidth in the contention-based transmission time period. In addition, during downlink transmission, the terminal node can correctly detect downlink information based on the correspondence between the contention-based transmission time periods and the transmission bandwidths.

In addition, in this embodiment of the present application, a same transmission bandwidth or different transmission bandwidths may be set for different contention-based transmission time periods, so that during uplink communication contention, terminal nodes operating at different bandwidths perform transmission based on capabilities of the terminal nodes, thereby avoiding a waste of bandwidth resources caused by various terminal nodes using a minimum bandwidth for communication in the prior art.

In a possible implementation, the N contention-based transmission time periods are N time periods in a contention access period CAP.

In the OWC network, when communication is performed based on a structure of a superframe, the coordinator may divide a part or all of the CAP into the N time periods, and may determine a sending bandwidth of the terminal node in each time period by determining the one-to-one correspondence between the N time periods and the N transmission bandwidths, to determine a receiving bandwidth.

In a possible implementation, the N contention-based transmission time periods are N contention-based timeslots CBTSs in a Media Access Control MAC cycle.

In the OWC network, when communication is performed based on the MAC cycle, the coordinator may set a correspondence between the CBTSs and the transmission bandwidths. In this way, when the terminal node transmits information, the coordinator can know a sending bandwidth of the terminal node based on a time synchronized with that of the terminal node, to determine a receiving bandwidth.

In a possible implementation, the receiving, by a terminal node, scheduling information sent by a coordinator includes: receiving, by the terminal node, a beacon frame sent by the coordinator, where the beacon frame carries the scheduling information.

In a possible implementation, the receiving, by a terminal node, scheduling information sent by a coordinator includes: receiving, by the terminal node, a Media Access Plan MAP frame sent by the coordinator, where the MAP frame carries the scheduling information.

In a possible implementation, the N transmission bandwidths include a maximum bandwidth supported by and/or a bandwidth currently used by the terminal node.

In a possible implementation, the N bandwidths further include a first bandwidth and/or a second bandwidth, the first bandwidth is a minimum bandwidth supported by a physical layer PHY mode, and the second bandwidth is a maximum bandwidth supported by the PHY mode.

In a possible implementation, the N contention-based transmission time periods are determined by the coordinator based on a total traffic volume of the OWC network, a traffic volume of each of the M terminal nodes, and the bandwidth information.

In a possible implementation, the method further includes: receiving, by the terminal node, indication information sent by the coordinator, where the indication information is used to indicate to perform transmission between the coordinator and the terminal node based on the scheduling information in the N contention-based transmission time periods.

The coordinator may indicate, by using the indication information, to perform transmission between the terminal node and the coordinator based on the scheduling information. In this way, when the terminal node performs transmission after successfully contending for a channel, the coordinator can determine the receiving bandwidth based on the correspondence between the transmission bandwidths and the contention-based transmission time periods.

In a possible implementation, when the N contention-based transmission time periods are the N time periods in the CAP, a time length t(i) of an $i^{th}$ time period in the N time periods is:

$$t(i) = \frac{\Sigma M(i)}{M} t_{CAP1}, i = 1, 2, \cdots N,$$

where $\Sigma M(i)$ represents a quantity of terminal nodes, in the M terminal nodes, corresponding to a bandwidth M(i) corresponding to the $i^{th}$ time period, and $t_{CAP1}$ represents a time length corresponding to a part or all of the CAP.

In a possible implementation, the beacon frame may carry a start time and an end time of each of the N contention-based transmission time periods and a transmission bandwidth corresponding to each contention-based transmission time period.

In a possible implementation, the beacon frame may alternatively carry a start time of each of the N contention-based transmission time periods, duration corresponding to each contention-based transmission time period, and a transmission bandwidth corresponding to each contention-based transmission time period.

According to a third aspect, this application provides an information transmission method in an optical wireless communications OWC network. The method includes: determining, by a coordinator, bandwidth information, where the bandwidth information is bandwidth information of each of M terminal nodes, the M terminal nodes are associated with the coordinator, and M is an integer greater than or equal to 1; determining, by the coordinator, N contention-based transmission time periods, and determining, based on the bandwidth information, N transmission bandwidths in a one-to-one correspondence with the N contention-based transmission time periods, where N is an integer greater than 1; sending, by the coordinator, scheduling information to the M terminal nodes, where the scheduling information is used to indicate the N transmission bandwidths and a correspondence, and the correspondence is the correspondence between the N transmission bandwidths and the N contention-based transmission time periods; receiving, by the M terminal nodes, the scheduling information; and performing, by one or more of the M terminal nodes, information transmission with the coordinator in one or more of the N contention-based transmission time periods based on the scheduling information.

According to a fourth aspect, this application provides an information transmission method in an optical wireless communications OWC network. The method includes: receiving, by a receiving node, a request to send (RTS) frame sent by a terminal node by using a first bandwidth, where the RTS frame includes first indication information; determining, by the receiving node, a second bandwidth based on the first indication information, where the second bandwidth is a sending bandwidth used when the terminal node sends to-be-sent information and a receiving bandwidth used when the receiving node receives the to-be-sent information; and sending, by the receiving node, a clear to send CTS frame to the sending node by using a third bandwidth.

According to the information transmission method in the OWC network, the receiving node may determine the second bandwidth by using the first indication information sent by the sending node, that is, the receiving bandwidth used when the receiving node receives the to-be-sent information subsequently sent by the sending node, so that the receiving node can correctly detect information (that is, the to-be-sent information) sent by the sending node. Specifically, during uplink communication, that is, when the receiving node is a coordinator, and the sending node is a terminal node, the coordinator can determine the second bandwidth based on the first indication information sent by the terminal node, so as to correctly detect uplink information (that is, the to-be-sent information) sent by the terminal node. During downlink communication, that is, when the receiving node is a terminal node and the sending node is a coordinator, the terminal node can determine the second bandwidth based on the first indication information sent by the coordinator, so as to correctly detect downlink information (that is, the to-be-sent information) sent by the coordinator.

In addition, in this embodiment of the present application, terminal nodes operating at different bandwidths may add different first indication information to the RTS frame. That is, the coordinator may determine, based on the first indication information, different receiving bandwidths corresponding to the different terminal nodes. In this way, during uplink transmission, each terminal node may use a transmission bandwidth different from a minimum bandwidth in the prior art, thereby avoiding a waste of bandwidth resources caused by various terminal nodes that use the minimum bandwidth for communication in the prior art.

In a possible implementation, the first indication information includes the second bandwidth.

The first indication information carries the second bandwidth, so that when receiving the RTS frame, the receiving node can directly use the second bandwidth as the receiving bandwidth, to receive the to-be-sent information sent by the sending node by using the second bandwidth. If the second bandwidth is not the minimum bandwidth in the OWC network, a waste of bandwidth resources caused by a sending node that use the minimum bandwidth for communication in the prior art can be avoided.

In a possible implementation, the first indication information further includes bandwidth information, the bandwidth information indicates the receiving node to send the second bandwidth to the sending node, and the CTS frame carries the second bandwidth.

The receiving node may determine, based on the RTS frame, a bandwidth used by the sending node to send information, and may provide a recommended bandwidth (the second bandwidth) by using the CTS frame based on a parameter such as a network resource status. In this way, the receiving node can correctly adjust a bandwidth of the receiving node. Further, network transmission can be optimized and resource utilization can be improved.

In a possible implementation, the method further includes: receiving, by the receiving node by using the second bandwidth, the to-be-sent information sent by the sending node.

In a possible implementation, the method further includes: sending, by the receiving node, an acknowledgement (ACK) frame to the sending node by using a fourth bandwidth.

After correctly receiving the to-be-sent information, the receiving node may send the ACK frame to the sending node, to inform the sending node that the receiving node has correctly received the data. If the receiving node does not correctly receive the to-be-sent information, the receiving node does not send the ACK frame to the sending node. In this case, the sending node may retransmit the to-be-sent data.

In a possible implementation, the receiving node is a coordinator, and the sending node is a terminal node. Before the receiving, by a receiving node, a request to send RTS frame sent by the sending node by using a first bandwidth, the method further includes: receiving, by the receiving node, second indication information sent by the sending node, where the second indication information is used to indicate the receiving node and the sending node to use an RTS/CTS protocol in a contention-based transmission time period.

In a possible implementation, the receiving node is a terminal node and the sending node is a coordinator. Before the receiving, by a receiving node, a request to send RTS frame sent by the sending node by using a first bandwidth, the method further includes: sending, by the receiving node, third indication information to the sending node, where the third indication information is used to indicate the receiving node and the sending node to use an RTS/CTS protocol in a contention-based transmission time period.

In a possible implementation, the contention-based transmission time period is a time period in a contention access period CAP or a contention-based timeslot CBTS in a MAC cycle.

In a possible implementation, the first bandwidth, the third bandwidth, and the fourth bandwidth may be the same.

In a possible implementation, the first bandwidth, the third bandwidth, and the fourth bandwidth may be different.

In a possible implementation, the first indication information may include a plurality of selectable bandwidths, and the plurality of selectable bandwidths include the second bandwidth.

The sending node may provide a plurality of selective bandwidths to the receiving node. The receiving node may determine a receiving bandwidth (the second bandwidth) based on a receiving capability of the receiving node and/or another related parameter, and inform, by using the CTS frame, the sending node of the receiving bandwidth finally determined by the receiving node, that is, a sending bandwidth of the sending node.

According to a fifth aspect, this application provides an information transmission method in an optical wireless communications OWC network. The method includes: generating, by a sending node, a request to send RTS frame, where the RTS frame includes first indication information; sending, by the sending node, the RTS frame to a receiving node by using a first bandwidth, where the first indication information is used by the receiving node to determine a second bandwidth, and the second bandwidth is a sending bandwidth used when the sending node sends to-be-sent information and a receiving bandwidth used when the receiving node receives the to-be-sent information; and receiving, by the sending node, a clear to send CTS frame sent by the receiving node by using a third bandwidth.

According to the information transmission method in the OWC network, the receiving node may determine the second bandwidth by using the first indication information sent by the sending node, that is, the receiving bandwidth used when the receiving node receives the to-be-sent information subsequently sent by the sending node, so that the receiving node can correctly detect information (that is, the to-be-sent information) sent by the sending node. Specifically, during uplink communication, that is, when the receiving node is a coordinator, and the sending node is a terminal node, the coordinator can determine the second bandwidth based on the first indication information sent by the terminal node, so as to correctly detect uplink information (that is, the to-be-sent information) sent by the terminal node. During downlink communication, that is, when the receiving node is a terminal node and the sending node is a coordinator, the terminal node can determine the second bandwidth based on the first indication information sent by the coordinator, so as to correctly detect downlink information (that is, the to-be-sent information) sent by the coordinator.

In addition, in this embodiment of the present application, terminal nodes operating at different bandwidths may add different first indication information to the RTS frame. That is, the coordinator may determine, based on the first indication information, different receiving bandwidths corresponding to the different terminal nodes. In this way, during uplink transmission, each terminal node may use a transmission bandwidth different from a minimum bandwidth in the prior art, thereby avoiding a waste of bandwidth resources caused by various terminal nodes that use the minimum bandwidth for communication in the prior art.

In a possible implementation, the first indication information includes the second bandwidth.

The first indication information carries the second bandwidth, so that when receiving the RTS frame, the receiving node can directly use the second bandwidth as the receiving bandwidth, to receive the to-be-sent information sent by the sending node by using the second bandwidth. If the second bandwidth is not the minimum bandwidth in the OWC network, a waste of bandwidth resources caused by a sending node that use the minimum bandwidth for communication in the prior art can be avoided.

In a possible implementation, the first indication information further includes bandwidth information, the bandwidth information indicates the receiving node to send the second bandwidth to the sending node, and the CTS frame carries the second bandwidth. The receiving node may determine, based on the RTS frame, a bandwidth used by the sending node to send information, and may provide a recommended bandwidth (the second bandwidth) by using the CTS frame based on a parameter such as a network resource status. In this way, the receiving node can correctly adjust a bandwidth of the receiving node. Further, network transmission can be optimized and resource utilization can be improved.

In a possible implementation, the method further includes: sending, by the sending node, the to-be-sent information to the receiving node by using the second bandwidth.

In a possible implementation, the method further includes: receiving, by the sending node, an acknowledgement ACK frame sent by the receiving node by using a fourth bandwidth.

In a possible implementation, the receiving node is a coordinator, and the sending node is a terminal node. Before the sending, by the sending node, the RTS frame to a receiving node by using a first bandwidth, the method further includes: receiving, by the sending node, second indication information sent by the receiving node, where the second indication information is used to indicate the receiving node and the sending node to use an RTS/CTS protocol in a contention-based transmission time period.

In a possible implementation, the receiving node is a terminal node and the sending node is a coordinator. Before the receiving, by a receiving node, a request to send RTS frame sent by the sending node by using a first bandwidth, the method further includes: sending, by the sending node, third indication information to the receiving node, where the third indication information is used to indicate the receiving node and the sending node to use an RTS/CTS protocol in a contention-based transmission time period.

In a possible implementation, the contention-based transmission time period is a time period in a contention access period CAP or a contention-based timeslot CBTS in a MAC cycle.

In a possible implementation, the first bandwidth, the third bandwidth, and the fourth bandwidth may be the same.

In a possible implementation, the first bandwidth, the third bandwidth, and the fourth bandwidth may be different.

In a possible implementation, the first indication information may include a plurality of selectable bandwidths, and the plurality of selectable bandwidths include the second bandwidth.

The sending node may provide a plurality of selective bandwidths to the receiving node. The receiving node may determine a receiving bandwidth (the second bandwidth) based on a receiving capability of the receiving node and/or another related parameter, and inform, by using the CTS frame, the sending node of the receiving bandwidth finally determined by the receiving node, that is, a sending bandwidth of the sending node.

According to a sixth aspect, this application provides an information transmission method in an optical wireless communications OWC network, including: receiving, by a sending node, a request to send RTS frame to a receiving node by using a first bandwidth, where the RTS frame includes first indication information; receiving, by the receiving node, the RTS frame, and determining a second bandwidth based on the first indication information in the RTS frame, where the second bandwidth is a sending bandwidth used when the sending node sends to-be-sent information and a receiving bandwidth used when the receiving node receives the to-be-sent information; and sending, by the receiving node, a clear to send CTS frame to the sending node by using a third bandwidth.

According to a seventh aspect, this application provides a coordinator in an optical wireless communications OWC network, configured to perform the method according to the first aspect or any possible implementation of the first aspect. Specifically, the coordinator includes a unit configured to perform the method according to the first aspect or any possible implementation of the first aspect.

According to an eighth aspect, this application provides a terminal node in an optical wireless communications OWC network, configured to perform the method according to the second aspect or any possible implementation of the second aspect. Specifically, the terminal node includes a unit configured to perform the method according to the second aspect or any possible implementation of the second aspect.

According to a ninth aspect, this application provides a receiving node in an optical wireless communications OWC network, configured to perform the method according to the third aspect or any possible implementation of the third aspect. Specifically, the receiving node includes a unit configured to perform the method according to the third aspect or any possible implementation of the third aspect.

According to a tenth aspect, this application provides a sending node in an optical wireless communications OWC network, configured to perform the method according to the fourth aspect or any possible implementation of the fourth aspect. Specifically, the sending node includes a unit configured to perform the method according to the fourth aspect or any possible implementation of the fourth aspect.

According to an eleventh aspect, this application provides a coordinator in an optical wireless communications OWC network. The coordinator includes a processor, a transceiver, and a memory. The memory is configured to store an instruction. The processor is configured to execute the instruction stored in the memory. The transceiver is configured to communicate with a terminal node in the optical wireless communications OWC network. When executing the instruction stored in the memory, the processor is configured to perform the method according to the first aspect or any possible implementation of the first aspect.

According to a twelfth aspect, this application provides a terminal node in an optical wireless communications OWC network. The terminal node includes a processor, a transceiver, and a memory. The memory is configured to store an instruction. The processor is configured to execute the instruction stored in the memory. The transceiver is configured to communicate with a coordinator in the optical wireless communications OWC network. When executing the instruction stored in the memory, the processor is configured to perform the method according to the second aspect or any possible implementation of the second aspect.

According to a thirteenth aspect, this application provides a receiving node in an optical wireless communications OWC network. The receiving node includes a processor, a transceiver, and a memory. The memory is configured to store an instruction. The processor is configured to execute the instruction stored in the memory. The transceiver is configured to communicate with a sending node in the optical wireless communications OWC network. When executing the instruction stored in the memory, the processor is configured to perform the method according to the third aspect or any possible implementation of the third aspect.

According to a fourteenth aspect, this application provides a sending node in an optical wireless communications OWC network. The sending node includes a processor, a transceiver, and a memory. The memory is configured to store an instruction. The processor is configured to execute the instruction stored in the memory. The transceiver is configured to communicate with a receiving node in the optical wireless communications OWC network. When executing the instruction stored in the memory, the processor is configured to perform the method according to the fourth aspect or any possible implementation of the fourth aspect.

According to a fifteenth aspect, this application provides an optical wireless communications OWC network, including the coordinator in the optical wireless communications OWC network according to the seventh aspect and the terminal node in the optical wireless communications OWC network according to the eighth aspect.

According to a sixteenth aspect, this application provides an optical wireless communications OWC network, including the coordinator in the optical wireless communications OWC network according to the eleventh aspect and the terminal node in the optical wireless communications OWC network according to the twelfth aspect.

According to a seventeenth aspect, this application provides an optical wireless communications OWC network, including the receiving node in the optical wireless communications OWC network according to the ninth aspect and the sending node in the optical wireless communications OWC network according to the tenth aspect.

According to an eighteenth aspect, this application provides an optical wireless communications OWC network, including the receiving node in the optical wireless communications OWC network according to the thirteenth aspect and the sending node in the optical wireless communications OWC network according to the fourteenth aspect.

According to a nineteenth aspect, a computer readable medium is provided, configured to store a computer program. The computer program includes an instruction used to perform the method according to the first aspect or any possible implementation of the first aspect.

According to a twentieth aspect, a computer readable medium is provided, configured to store a computer program. The computer program includes an instruction used to perform the method according to the second aspect or any possible implementation of the second aspect.

According to a twenty-first aspect, a computer readable medium is provided, configured to store a computer program. The computer program includes an instruction used to perform the method according to the third aspect.

According to a twenty-second aspect, a computer readable medium is provided, configured to store a computer program. The computer program includes an instruction used to perform the method according to the fourth aspect or any possible implementation of the fourth aspect.

According to a twenty-third aspect, a computer readable medium is provided, configured to store a computer program. The computer program includes an instruction used to perform the method according to the fifth aspect or any possible implementation of the fifth aspect.

According to a twenty-fourth aspect, a computer readable medium is provided, configured to store a computer program. The computer program includes an instruction used to perform the method according to the sixth aspect.

BRIEF DESCRIPTION OF THE DRAWINGS

To describe the technical solutions in the embodiments of the present application more clearly, the following briefly describes the accompanying drawings required for describing the embodiments of the present application. Apparently, the accompanying drawings in the following description show merely some embodiments of the present application, and a person of ordinary skill in the art may still derive other drawings from these accompanying drawings without creative efforts.

DETAILED DESCRIPTION

The following clearly describes the technical solutions in the embodiments of the present application with reference to the accompanying drawings in the embodiments of the present application. Apparently, the described embodiments are some rather than all of the embodiments of the present application. All other embodiments obtained by a person of ordinary skill in the art based on the embodiments of the present application without creative efforts shall fall within the protection scope of the present application.

Figure 1:
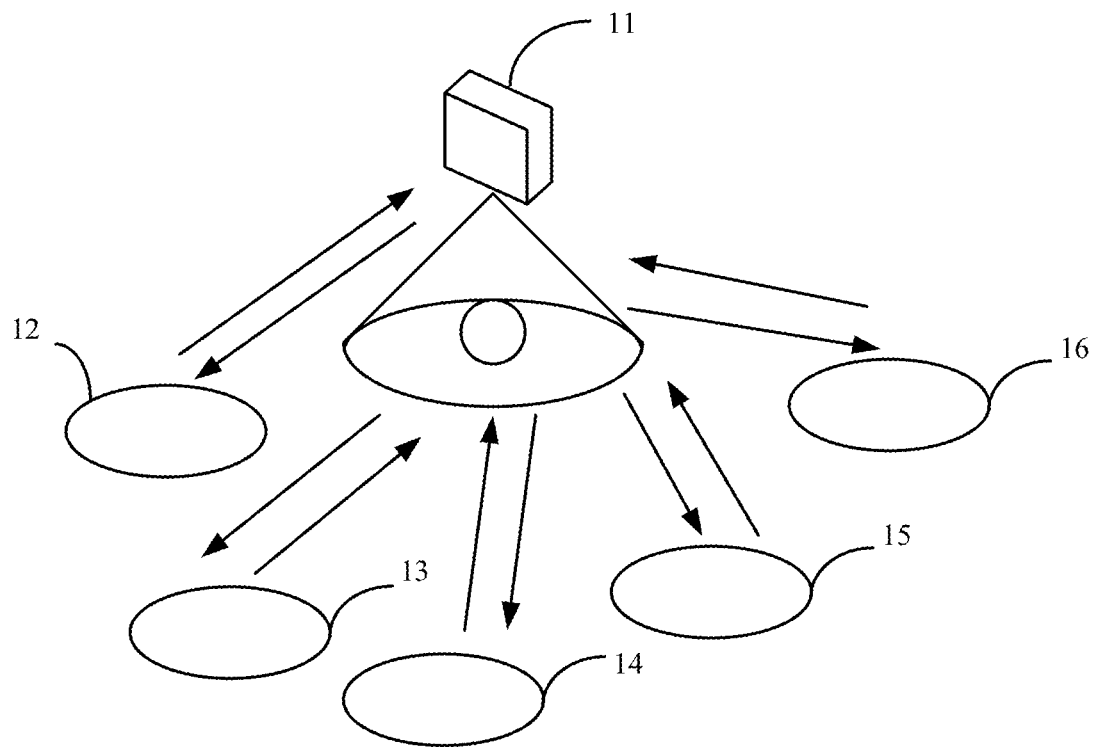
FIG. 1 is a schematic diagram of a topology of a VPAN.

FIG. 1 is a schematic diagram of a topology of a VPAN. As shown in FIG. 1, a coordinator 11 is responsible for management of a terminal node that newly joins the VPAN, resource scheduling, coordination, a handover, and the like. The coordinator 11 may be located at an LED light source. Terminal nodes 12 to 16 perform network access, data transmission, and the like by using visible light communications links between the terminal nodes 12 to 16 and the coordinator 11. The terminal nodes may be mobile phones, tablet computers, notebook computers, or the like.

Figure 2:
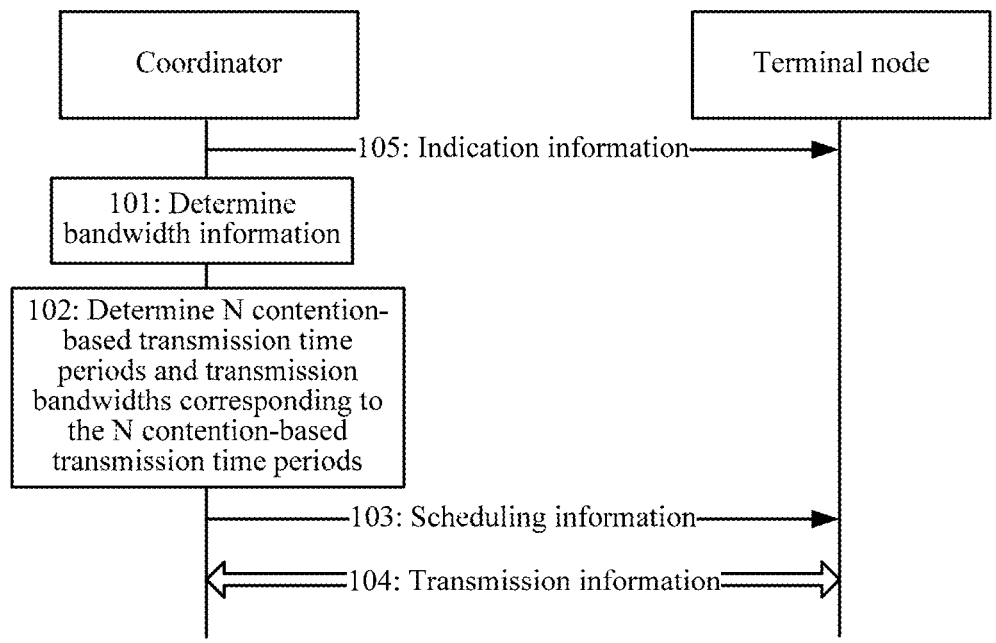
FIG. 2 is a schematic interaction diagram of an information transmission method in an optical wireless communications network according to an embodiment of the present application.

FIG. 2 shows an information transmission method in an optical wireless communications OWC network according to an embodiment of the present application. The method may be applied to the network shown in FIG. 1. However, this is not limited in the present application.

101: A coordinator determines bandwidth information. The bandwidth information may include bandwidth information of each of M terminal nodes, the M terminal nodes are associated with the coordinator, and M is an integer greater than or equal to 1.

Optionally, the bandwidth information may include a maximum bandwidth supported by each of the M terminal nodes and/or a bandwidth currently used by each of the M terminal nodes.

Optionally, the bandwidth information may further include a maximum bandwidth supported by the coordinator and/or a bandwidth currently used by the coordinator. It should be understood that the coordinator in this embodiment of the present application may be a wireless access point (AP), and the terminal node may be a station (STA). This is not limited in the present application. Optionally, the bandwidth information may further include the maximum bandwidth supported by and/or the bandwidth currently used by the coordinator.

Bandwidths of the terminal node and the coordinator may be a modulation bandwidth of an LED. The modulation bandwidth of the LED is a maximum frequency bandwidth that can bear a modulation signal when a device is loading the signal. Usually, the modulation bandwidth of the LED is defined as a frequency when alternating-current optical power output by the LED is decreased to half (for example, −3 dB) of a low-frequency reference frequency value. The modulation bandwidth of the LED is a decisive factor of a channel capacity and a transmission rate in a visible light communication system, and is affected by a plurality of factors such as an actual depth of modulation from the device and a volt-ampere characteristic.

In addition, because different LEDs have different materials and processes, modulation bandwidths of the different LEDs may be different. This means that for different terminal nodes and the coordinator, modulation bandwidths that can be supported by the terminal nodes and the coordinator may be different. For example, modulation bandwidths of some terminal nodes may have a maximum value of 5 MHz, and modulation bandwidths of some other terminal nodes may have a maximum value of 50 MHz.

Using the network shown in FIG. 1 as an example, there are five terminal nodes associated with the coordinator. Maximum bandwidths supported by or bandwidths currently used by the terminal nodes and the coordinator are shown in Table 1.

TABLE 1

| Network node | Bandwidth |
| --- | --- |
| Coordinator 11 | 100 MHz |
| Terminal node 12 | 50 MHz |
| Terminal node 13 | 50 MHz |
| Terminal node 14 | 20 MHz |
| Terminal node 15 | 20 MHz |
| Terminal node 16 | 10 MHz |

To determine the bandwidth information, the coordinator may determine bandwidth information of all terminal nodes associated with the coordinator. That is, M=5. In this case, the bandwidth information of all the terminal nodes associated with the coordinator is used for a next step. Alternatively, the coordinator may determine bandwidth information of some terminal nodes associated with the coordinator. That is, M is an integer less than 5 and greater than or equal to 1. For example, the coordinator determines bandwidth information of only the terminal nodes 12, 13, and 14. In this case, M=3, and the bandwidth information of only the terminal nodes 12, 13, and 14 is used for a next step.

It should be understood that the network node may be the terminal node or the coordinator.

It should be noted that using the terminal node 13 as an example, if the terminal node 13 supports a maximum bandwidth of 50 MHz, generally, the terminal node 13 can also support a lower bandwidth, such as 20 MHz or 5 MHz.

The bandwidth currently used by each of the foregoing terminal node may be a used bandwidth negotiated between the terminal node and the coordinator. The bandwidth may not be the maximum bandwidth supported by the terminal node.

102: The coordinator determines N contention-based transmission time periods, and determines, based on the bandwidth information, N transmission bandwidths in a one-to-one correspondence with the N contention-based transmission time periods, where N is an integer greater than or equal to 1.

Optionally, the N contention-based transmission time periods are N time periods in a CAP.

Figure 3:
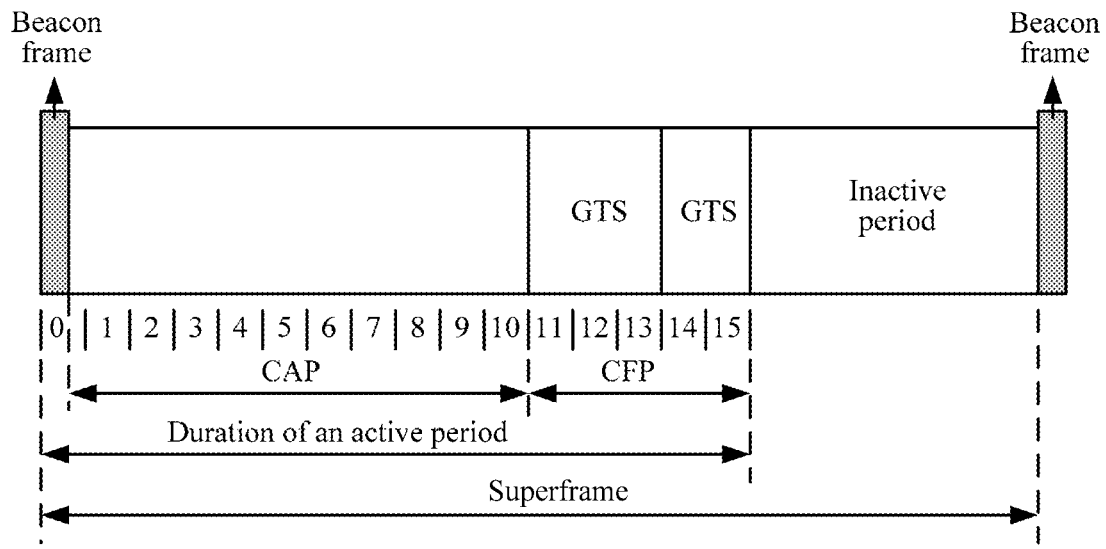
FIG. 3 is a schematic diagram of a structure of a superframe.

The IEEE 802.15.7 standard supports two working modes: a beacon-enabled VPAN and a non-beacon enabled VPAN. A coordinator in the beacon enabled VPAN periodically sends beacon frames. A timeslot for sending a beacon frame periodically occupies a start position in each superframe. The beacon frame may carry some common information of the network, such as a number (Identification) of the network and a length of a superframe. A structure of the superframe is shown in FIG. 3. A superframe includes an active period and an inactive period. The active period includes a beacon timeslot used for sending a beacon, a contention access period CAP, and a contention free period CFP. In the CAP, any node that needs to send data and other nodes that need to send data contend, through CSMA/CA, for permission to use a channel. The CFP is further divided into some guaranteed timeslots (GTS). In each GTS, the coordinator allows only a specified device to communicate with the coordinator, and one GTS may occupy a plurality of timeslots. The GTS can support quality of service (QoS) of a service, and ensure real-time service transmission.

In this embodiment of the present application, the coordinator may further divide, based on the maximum bandwidth supported by or the bandwidth currently used by each terminal node, a part or all of the CAP into N regions, that is, the N contention-based transmission time periods. In each region, the coordinator or the terminal node is allowed to use a fixed bandwidth to perform transmission. That the coordinator divides all of the CAP, that is, the entire CAP is used as an example for description. Using Table 1 as an example, the coordinator may divide the CAP into 3 to 5 parts. That is, N may be 3, 4, or 5. Three division cases are respectively shown in FIG. 4A, FIG. 4B, and FIG. 4C.

Figure 4A:
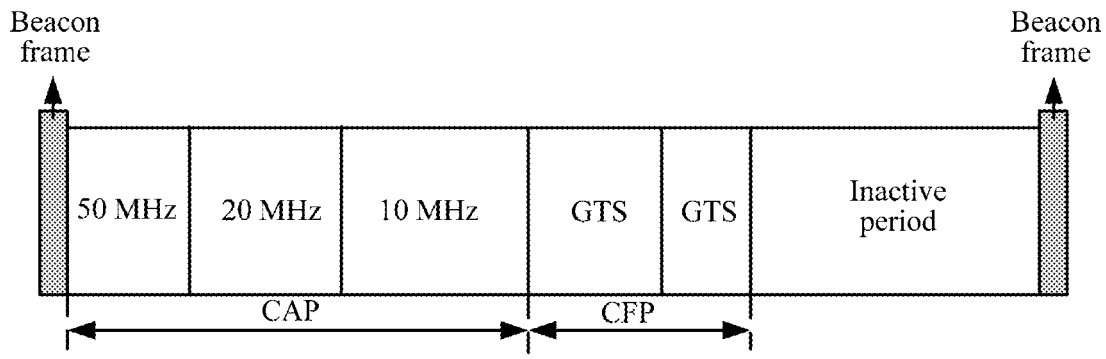
FIG. 4A to FIG. 4C are schematic diagrams of division of a contention access period according to an embodiment of the present application.

In FIG. 4A, only the bandwidth supported by each terminal node is considered.

Figure 4B:
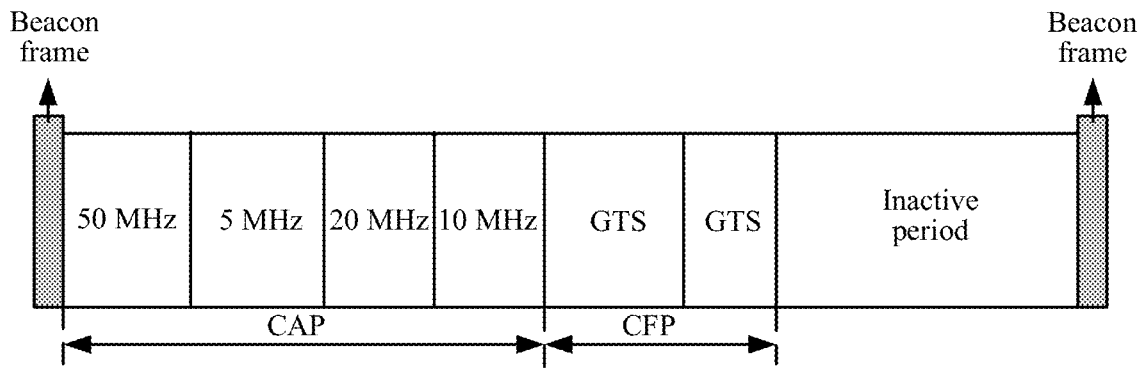

In FIG. 4B, the bandwidth supported by each terminal node is considered. In addition, a default bandwidth 5 MHz of a network is included. The default bandwidth may be used for some special applications, for example, a new terminal node joins a network.

Figure 4C:
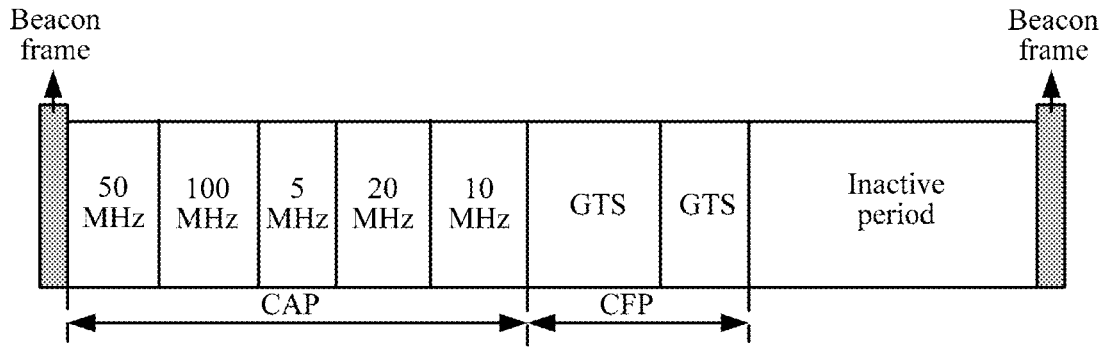

In FIG. 4C, a region in which 100 MHz is allowed to be used for transmission is included. The region may be applied to downlink transmission.

Optionally, the N contention-based transmission time periods are N contention-based timeslots CBTSs in a Media Access Control MAC cycle.

Figure 5:
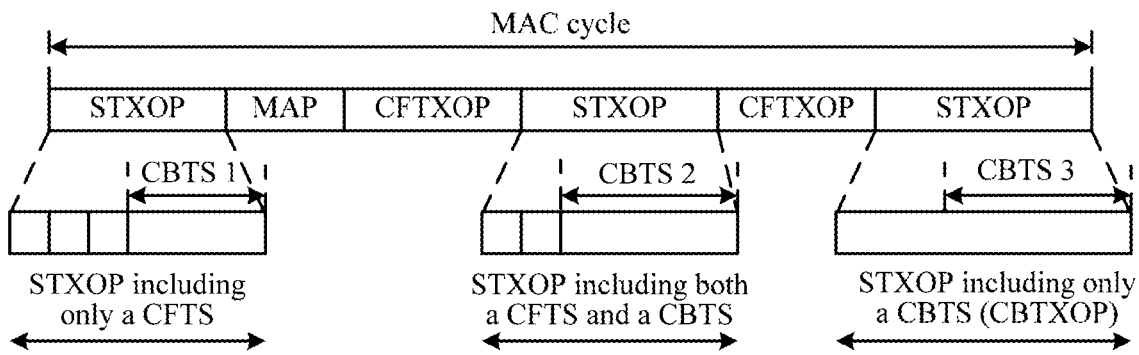
FIG. 5 is a schematic diagram of a structure of a MAC cycle.

In the OWC network, the coordinator may alternatively perform network resource and transmission scheduling based on the MAC cycle. As shown in FIG. 5, each MAC cycle may be divided into a CFTXOP and an STXOP. A contention-free transmission manner is used in the CFTXOP. The STXOP may include a CFTS and a CBTS. The STXOP may include both the CBTS and the CFTS, or may include only the CFTS or only the CBTS. The STXOP including only the CBTS is also referred to as a contention-based transmission opportunity (CBTXOP). Each MAC cycle needs to include at least one transmission opportunity (TXOP) specially used for sending a MAP frame. The MAP frame carries some common information of the network, such as a network identifier and resource scheduling information.

In this embodiment of the present application, the coordinator determines, based on the bandwidth information, the N transmission bandwidths corresponding to the N CBTSs. Using the MAC cycle shown in FIG. 5 as an example, the coordinator may determine three transmission bandwidths corresponding to three CBTSs. For example, the coordinator may specify a 50 MHz transmission bandwidth for a CBTS 1, a 20 MHz transmission bandwidth for a CBTS 2, and a 10 MHz transmission bandwidth for a CBTS 3. For example, the coordinator may specify a 10 MHz transmission bandwidth for a CBTS 1, a 50 MHz transmission bandwidth for a CBTS 2, and a 20 MHz transmission bandwidth for a CBTS 3.

It should be understood that in this embodiment of the present application, the N transmission bandwidths may be the same or different. For example, in the CAP, an earlier period of time is allocated for use at a 5 MHz bandwidth, and a later period of time may also be allocated for use at the 5 MHz bandwidth.

Optionally, the N bandwidths further include a first bandwidth and/or a second bandwidth, the first bandwidth is a minimum bandwidth supported by a physical layer PHY mode, and the second bandwidth is a maximum bandwidth supported by the PHY mode.

In a current visible light communication technology, there are a plurality of PHY modes. Bandwidths supported by different PHY modes may be different. For example, a PHY 1 mode supports bandwidths 5 MHz to 50 MHz, and a PHY 2 mode supports bandwidths 50 MHz to 200 MHz. Therefore, for different PHY modes, a value of a minimum bandwidth and a value of a maximum bandwidth are different. That is, the first bandwidth may be 5 MHz or 50 MHz. Correspondingly, the second bandwidth may be 50 MHz or 200 MHz. This is not limited in the present application.

Optionally, when the N contention-based transmission time periods are the N time periods in the CAP, a time length $t(i)$ of an $i^{th}$ time period in the N time periods is:

$$t(i) = \frac{\Sigma M(i)}{M} t_{CAP1}, i = 1, 2, \cdots N,$$

where $\Sigma M(i)$ represents a quantity of terminal nodes, in the M terminal nodes, corresponding to a bandwidth $M(i)$ corresponding to the $i^{th}$ time period, and $t_{CAP1}$ represents a time length corresponding to a part or all of the CAP.

That is, the coordinator performs equal allocation based on a quantity of devices that support (or use) each bandwidth. With reference to Table 1 and FIG. 4A, for example, $2/5*(2/5)*t_{CAP}$ is allocated to both a terminal node supporting 50 MHz and a terminal node supporting 20 MHz, and $(1/5)*t_{CAP}$ is allocated to a terminal node supporting 10 MHz, where $t_{CAP}$ represents duration of the CAP, that is, a time length corresponding to all of the CAP.

In an example, with reference to Table 1 and FIG. 4B, considering a default bandwidth (specially used for association, and the like), $(1/5)*t_{CAP}$ is allocated to both a terminal node supporting 5 MHz and a terminal node supporting 20 MHz, and $(2/5)*t_{CAP}$ is allocated to a terminal node supporting 50 MHz.

Optionally, the N contention-based transmission time periods are N contention-based transmission time periods determined by the coordinator based on a total traffic volume of the OWC network, a traffic volume of each of the M terminal nodes, and the bandwidth information.

For example, for the CAP, the coordinator may divide a region for each bandwidth based on a traffic volume of a different terminal node. For example, in five terminal nodes shown in Table 1, a traffic volume of the terminal node 12 and the terminal node 13 occupies 60% of the total traffic volume. In this case, the coordinator may allocate 60% of the part or all of the CAP for a 50 MHz bandwidth for use. For a terminal node with a relatively small traffic volume, a corresponding relatively short time period may be allocated for service transmission of the terminal node.

In this embodiment of the present application, the coordinator may further divide the part or all of the CAP as follows: Considering that a transmission time is relatively short in a case of a large operating bandwidth, the coordinator may allocate a relatively small region to a terminal node using a large operating bandwidth. Using FIG. 4A as an example, $(1/6)*t_{CAP}$ is allocated to a terminal node supporting 50 MHz, and $(5/12)*t_{CAP}$ is allocated to both a terminal node supporting 20 MHz and a terminal node supporting 10 MHz.

In this embodiment of the present application, a rule or an algorithm used by the coordinator to divide the CAP into regions is related to an algorithm for device implementation. In this embodiment of the present application, the foregoing method is only used as an example for description, but the present application is not limited thereto.

For another example, for the CBTS, as shown in FIG. 5, the coordinator may determine only two contention-based transmission time periods: the CBTS 1 and the CBTS 2. Corresponding transmission bandwidths are specified for the CBTS 1 and the CBTS 2, and no operation is performed on the CBTS 3. In the CBTS 3, the coordinator and the terminal node may perform transmission in an original communication and transmission manner.

It should be understood that generally, the CBTXOP includes a plurality of CBTSs. Therefore, that the CBTS 3 occupies only a part of the CBTXOP is used as an example herein.

103: The coordinator sends scheduling information to the M terminal nodes. The scheduling information is used to indicate the N transmission bandwidths and a correspondence, and the correspondence is the correspondence between the N transmission bandwidths and the N contention-based transmission time periods.

The terminal node may determine, based on the scheduling information, a transmission bandwidth corresponding to a corresponding contention-based transmission time period. When the terminal node successfully contends for a channel and performs transmission, the coordinator may determine a receiving bandwidth, and may receive, by using the receiving bandwidth, information transmitted by the terminal node.

Optionally, in step 103, the coordinator may send a beacon frame to the M terminal nodes. The beacon frame carries the scheduling information.

Specifically, when communication is performed in the OWC network based on the superframe, the coordinator may send the beacon frame to terminals, to inform the terminal nodes of the N transmission bandwidths and the correspondence between the N transmission bandwidths and the N contention-based transmission time periods that are set by the coordinator.

For example, the beacon frame may carry a start time and an end time of each time period, a bandwidth allowed to be used for sending in each time period, and the like.

For another example, the beacon frame may alternatively carry a start time and duration of each time period, a bandwidth allowed to be used for sending within the duration, and the like.

Optionally, in step 103, the coordinator may send a MAP frame to the M terminal nodes. The MAP frame carries the scheduling information.

Specifically, when communication is performed in the OWC network based on the MAC cycle, the coordinator may send the MAP frame to terminals, to inform the terminal nodes of the N transmission bandwidths and the correspondence between the N transmission bandwidths and the N contention-based transmission time periods that are set by the coordinator.

Optionally, the method may further include step 104: The coordinator performs, in the N time periods separately, information transmission with some or all of the M terminal nodes by using transmission bandwidths in a one-to-one correspondence with the N time periods.

Specifically, that communication is performed in the OWC network based on the superframe is used as an example for description. During uplink transmission, after receiving the scheduling information, the terminal nodes may know a specific division status of (a part or all of) the CAP. The terminal nodes contend for transmission in combination with bandwidth conditions that can be supported by the terminal nodes. For example, the terminal node 14 supports a maximum bandwidth of 20 MHz. Therefore, the terminal node 14 may contend for transmission in a time period corresponding to 20 MHz. Considering that a region that is specified by the coordinator and that corresponds to a bandwidth is relatively small, some terminal nodes may not be able to complete transmission in the region. In this case, the terminal nodes may switch to a lower bandwidth for sending in another region. For example, the terminal node 12 supports a maximum bandwidth of 50 MHz, and can also support a lower bandwidth, such as 20 MHz, 10 MHz, or 5 MHz. However, in a region in which transmission can be performed by using the 50 MHz bandwidth, the terminal node 12 cannot successfully perform sending. In this case, the terminal node 12 may switch to 20 MHz, and contend for transmission in an allocated region in which transmission can be performed by using the 20 MHz bandwidth.

For downlink transmission, the terminal node needs to know a sending bandwidth of the coordinator, to receive information by using a same bandwidth. Specifically, during the downlink transmission, the coordinator contends for transmission in combination with a bandwidth condition that can be supported by the coordinator and a bandwidth condition that can be supported by the terminal node. For example, if a maximum bandwidth that can be supported by the coordinator 11 is 100 MHz, the coordinator 11 may send information to the terminal node 12 in a region for the 50 MHz bandwidth. In this case, the terminal node 12 receives information by using the 50 MHz bandwidth.

Optionally, the method may further include step 105: The coordinator sends indication information to each of the M terminal nodes. The indication information is used to indicate the coordinator and each of the M terminal nodes to perform transmission based on the scheduling information in the N contention-based transmission time periods.

The coordinator may indicate, to the terminal node, whether transmission between the coordinator and the terminal node is performed based on the scheduling information. Specifically, the coordinator may indicate, by using the indication information, to perform transmission between the terminal node and the coordinator based on the scheduling information. In this way, when the terminal node performs transmission after successfully contending for a channel, the coordinator can determine the receiving bandwidth based on the correspondence between the transmission bandwidths and the contention-based transmission time periods.

Optionally, the indication information may be carried based on the beacon frame.

Specifically, the beacon frame may carry both the indication information and the scheduling information, and one or more bits in the beacon frame may be used to indicate the terminal node and the coordinator to perform transmission based on the scheduling information.

Optionally, the indication information may be carried by using the MAP frame.

Specifically, the MAP frame may carry both the indication information and the scheduling information, and one or more bits in the MAP frame may be used to indicate the terminal node and the coordinator to perform transmission based on the scheduling information.

In this embodiment of the present application, the coordinator may first send the indication information, and then send the scheduling information. Certainly, the coordinator may alternatively first send the scheduling information, and then send the indication information. This is not limited in the present application.

In this embodiment of the present application, the coordinator determines the correspondence between the contention-based transmission time periods and the transmission bandwidths based on the bandwidth information, so that when the terminal node transmits information in a contention-based transmission time period, the coordinator can receive information by using a corresponding bandwidth in the contention-based transmission time period. In addition, during downlink transmission, the terminal node can correctly detect downlink information based on the correspondence between the contention-based transmission time periods and the transmission bandwidths.

In addition, in this embodiment of the present application, a same transmission bandwidth or different transmission bandwidths may be set for different contention-based transmission time periods, so that during uplink communication contention, terminal nodes operating at different bandwidths perform transmission based on capabilities of the terminal nodes, thereby avoiding a waste of bandwidth resources caused by various terminal nodes using a minimum bandwidth for communication in the prior art.

Figure 6:
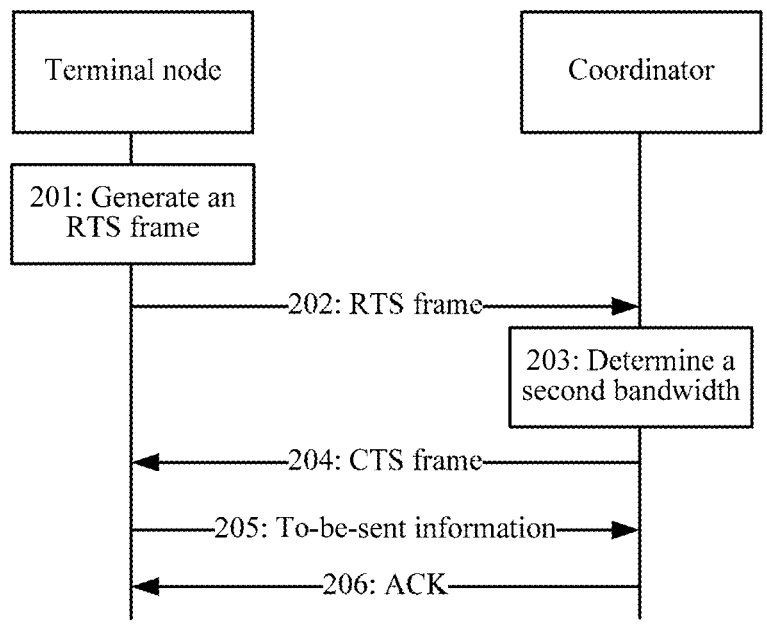
FIG. 6 is a schematic interaction diagram of an information transmission method in an optical wireless communications network according to another embodiment of the present application.

FIG. 6 shows an information transmission method in an optical wireless communications OWC network according to another embodiment of the present application. The method may be applied to the network shown in FIG. 1. However, this is not limited in the present application.

The information transmission method in the OWC network according to this embodiment of the present application is described below by using a receiving node as a coordinator and using a sending node as a terminal node.

201: The terminal node generates an RTS frame.

202: The terminal node sends the RTS frame to the coordinator by using a first bandwidth.

The RTS frame may include first indication information. The first indication information is used by the coordinator to determine a second bandwidth, that is, a receiving bandwidth used by the coordinator when the terminal node subsequently sends to-be-sent information. The second bandwidth is also a sending bandwidth subsequently used by the terminal node to send the to-be-sent information.

The RTS/CTS protocol is used to resolve a hidden terminal problem. The hidden terminal problem means that a network node A (the coordinator or the terminal node) sends information to a network node B, and a network node C also sends information to the network node B without learning, through listening, that the network node A is sending information to the network node B. In this case, the network node A and the network node C send signals to the network node B simultaneously, leading to a signal conflict. Consequently, the network node B cannot correctly detect a signal, causing a loss of efficiency.

Figure 7:
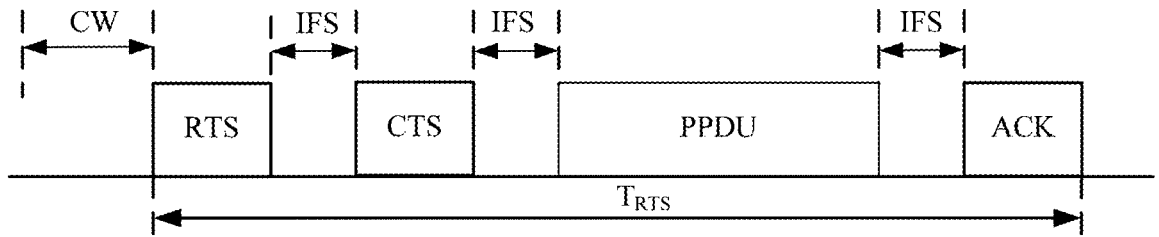
FIG. 7 is a schematic flowchart of communication according to a CTS/RTS protocol.

In the RTS/CTS protocol, as shown in FIG. 7, after successfully contending for a channel in a contention window (CW), the network node A sends an RTS frame to the network node B, indicating that the network node A is to send a physical layer protocol data unit (PPDU) to the network node B. After receiving the RTS frame, the network node B sends (broadcasts) a CTS frame to all network nodes after an interframe space (IFS), indicating being in readiness. After the IFS, the network node A may send the PPDU, and all other network nodes that are intended to send signals to the network node B temporarily stop sending. If the network node B correctly receives the PPDU, the network node B may send an ACK frame to the network node A. The two parties formally transfer data after completing an RTS/CTS handshake, so as to ensure that a plurality of sending network nodes that are invisible to each other send data to a same network node, thereby avoiding a conflict. In addition, even if there is a conflict, the conflict occurs when the RTS frame is sent. In this case, because no network node receives the CTS frame, the network nodes contend for a channel again according to a random backoff rule.

Specifically, in this embodiment of the present application, during uplink transmission, after successfully contending for a channel, the terminal node first sends an RTS frame. The RTS frame may be sent by using a fixed bandwidth, namely, the first bandwidth. Usually, the RTS frame is sent by using a minimum bandwidth. In this case, the coordinator is configured to receive information by using the fixed bandwidth.

Optionally, the first indication information may include the second bandwidth.

In an example, a format of the RTS frame is shown in Table 2.

TABLE 2

| Field | Description |
| --- | --- |
| Duration | Duration $T_{RTS}$ of an RTS frame and subsequent transmission, as shown in FIG 7. |
| Address of a CTS node | An address of a coordinator; for uplink transmission, the address is an address of a coordinator, and for downlink transmission, the address is an address of a terminal node. |
| Second bandwidth | Indicates a bandwidth that is to be used for sending to-be-sent information (a service data/management frame) subsequently. |
| Other | Other |

203: The coordinator determines a second bandwidth based on first indication information.

For example, the second bandwidth carried in the first indication information may be determined as the second bandwidth. That is, the coordinator uses the second bandwidth indicated in the first indication information as the receiving bandwidth to receive the to-be-sent information.

204: The coordinator sends a CTS frame to the terminal node by using a third bandwidth.

Usually, the third bandwidth may be the foregoing minimum bandwidth, but the present application is not limited thereto.

In an example, a format of the CTS frame is shown in Table 3.

TABLE 3

| Field | Description |
| --- | --- |
| Duration | Duration TCTS of a CTS frame and subsequent transmission, as shown in FIG 7. |
| Address of an RTS node (optional) | An address of a terminal node |
| Other | Other |

In this embodiment of the present application, the coordinator may determine the second bandwidth by using the first indication information sent by the terminal node, that is, the receiving bandwidth used when the coordinator receives the to-be-sent information subsequently sent by the terminal node, so that the coordinator can correctly detect information (that is, the to-be-sent information) sent by the terminal node.

In addition, in this embodiment of the present application, terminal nodes operating at different bandwidths may add different first indication information to the RTS frame. That is, the coordinator may determine, based on the first indication information, different receiving bandwidths corresponding to the different terminal nodes. In this way, during uplink transmission, each terminal node may use a transmission bandwidth different from a minimum bandwidth in the prior art, thereby avoiding a waste of bandwidth resources caused by various terminal nodes that use the minimum bandwidth for communication in the prior art.

Optionally, the first indication information may further include bandwidth information, and the bandwidth information indicates the coordinator to send the second bandwidth to the terminal node. In this case, when sending the CTS frame to the terminal node by using the third bandwidth, the coordinator may add the second bandwidth to the CTS frame.

Specifically, the RTS frame may further indicate the coordinator to send a recommended bandwidth to the terminal node based on a receiving capability of the coordinator. In this case, after receiving the RTS frame, the coordinator sends, to the terminal node based on an indication in the RTS frame, the CTS frame carrying the bandwidth information, to inform the terminal node that the bandwidth recommended by the coordinator is the second bandwidth. In addition, the coordinator switches to the second bandwidth for receiving, and sends the CTS frame by using the third bandwidth. After receiving the CTS frame, the coordinator parses out the recommended bandwidth, namely, the second bandwidth, indicated in the CTS frame, and sends the to-be-sent information by using the second bandwidth.

It should be noted that the third bandwidth and the first bandwidth may be the same, or the third bandwidth and the first bandwidth may be different.

In another example, a format of the RTS frame is shown in Table 4.

TABLE 4

| Field | Description |
| --- | --- |
| Duration | Duration $T_{RTS}$ of an RTS frame and subsequent transmission, as shown in FIG 7. |
| Address of a CTS node | An address of a coordinator; for uplink transmission, the address is an address of a coordinator, and for downlink transmission, the address is an address of a terminal node. |
| $M^{th}$ bandwidth | Indicates a bandwidth that is to be used for sending to-be-sent information (a service data/management frame) subsequently. |
| Other | Other |
| Bandwidth negotiation allowed | The coordinator is allowed to provide a recommended bandwidth based on a channel status and a processing capability of the coordinator. |

In another example, a format of the CTS frame is shown in Table 5.

TABLE 5

| Field | Description |
| --- | --- |
| Duration | Duration TCTS of a CTS frame and subsequent transmission, as shown in FIG 7. |
| Address of an RTS node (optional) | Indicates that the CTS frame responds to an RTS frame sent by which device. |
| Recommended bandwidth (second bandwidth) | Recommended bandwidth to be used when a device sending the RTS frame sends subsequent to-be-sent information (a service data/management frame) |
| Other | Other |

In Table 4, the $M^{th}$ bandwidth may be or may not be the second bandwidth. That is, the receiving bandwidth recommended by the coordinator may be a bandwidth added by the terminal node to the RTS frame, or may not be a bandwidth carried in the RTS frame. When the receiving bandwidth recommended by the coordinator is different from the bandwidth added by the terminal node to the RTS frame, after receiving the CTS frame, the terminal node performs transmission by using a bandwidth (the second bandwidth) carried in the CTS frame. In addition, the coordinator performs receiving by using the second bandwidth.

In this embodiment of the present application, the first indication information may further carry a plurality of bandwidths, the plurality of bandwidths may be bandwidths such as a maximum bandwidth that can be supported by and a bandwidth currently used by the terminal node. After receiving the first indication information, the coordinator may select one of the plurality of bandwidths as the receiving bandwidth, and informs a selection result of the coordinator by using the CTS frame. After receiving the CTS frame, the terminal node performs transmission by using a bandwidth (the second bandwidth) in the selection result in the CTS frame. In addition, the coordinator performs receiving by using the second bandwidth.

In this embodiment of the present application, the coordinator may determine, based on the RTS frame, a bandwidth used by the terminal node to send information, and may provide a recommended bandwidth (the second bandwidth) by using the CTS frame based on a parameter such as a network resource status. In this way, the coordinator can correctly adjust a bandwidth of the coordinator. Further, network transmission can be optimized and resource utilization can be improved.

Optionally, the method may further include step 205: The terminal node sends the to-be-sent information to the coordinator by using the second bandwidth.

Specifically, in this embodiment of the present application, the coordinator also receives the to-be-sent information by using the second bandwidth.

Optionally, the method may further include step 206: The terminal node receives an acknowledgement ACK frame sent by the coordinator by using a fourth bandwidth.

The fourth bandwidth may be the same as or may be different from the first bandwidth and the third bandwidth. For example, all of the first bandwidth, the third bandwidth, and the fourth bandwidth may be the foregoing minimum bandwidth. However, this is not limited in the present application.

Specifically, after correctly receiving the to-be-sent information, the coordinator may send the ACK frame to the terminal node, to inform the terminal node that the coordinator has correctly received the data. If the coordinator does not correctly receive the to-be-sent information, the coordinator does not send the ACK frame to the terminal node. In this case, the terminal node may retransmit the to-be-sent data.

Optionally, before step 201, the method may further include: receiving, by the terminal node, second indication information sent by the coordinator. The second indication information is used to indicate the coordinator and the terminal node to use the RTS/CTS protocol in a contention-based transmission time period. That is, the terminal node can send the RTS frame to the coordinator only when the coordinator determines that the coordinator and the terminal node can use the RTS/CTS protocol, so that the coordinator determines the receiving bandwidth based on the RTS frame.

Optionally, the contention-based transmission time period is a time period in a contention access period CAP or a contention-based timeslot CBTS in a MAC cycle.

Specifically, in the OWC network, the coordinator may perform network resource and transmission scheduling based on the superframe or the MAC cycle. The coordinator and the terminal node may perform transmission by using the RTS/CTS protocol in the CAP shown in FIG. 3 or the CBTS shown in FIG. 5.

It should be understood that when the sending node is a coordinator, and the receiving node is a terminal node, a method used by the terminal node to determine the receiving bandwidth and a method used by the coordinator to determine the sending bandwidth are similar to the foregoing methods. In addition, during downlink communication, that is, when the receiving node is the terminal node, and the sending node is the coordinator, the terminal node can determine the second bandwidth based on the first indication information sent by the coordinator, so as to correctly detect downlink information (that is, the to-be-sent information) sent by the coordinator. For brevity, details are not described herein again.

The information transmission method in the optical wireless communications OWC network in the embodiments of the present application is described in detail in the foregoing with reference to FIG. 1 to FIG. 7. A coordinator and a terminal node in the OWC network in the embodiments of the present application are described in detail in the following with reference to FIG. 8 to FIG. 15.

Figure 8:
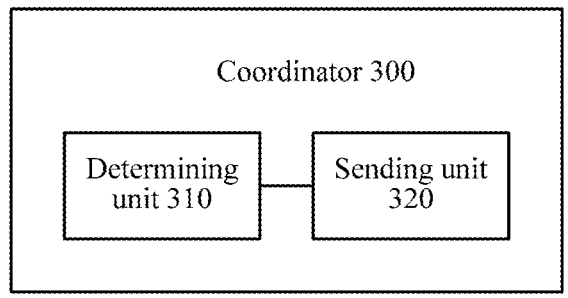
FIG. 8 is a schematic block diagram of a coordinator according to an embodiment of the present application.

FIG. 8 is a schematic block diagram of a coordinator 300 in an OWC network according to an embodiment of the present application. As shown in FIG. 8, the coordinator 300 includes a determining unit 310 and a sending unit 320.

The determining unit 310 is configured to determine bandwidth information. The bandwidth information includes bandwidth information of each of M terminal nodes, the M terminal nodes are associated with the coordinator, and M is an integer greater than or equal to 1.

The determining unit 310 is further configured to: determine N contention-based transmission time periods, and determine, based on the bandwidth information, N transmission bandwidths in a one-to-one correspondence with the N contention-based transmission time periods, where N is an integer greater than 1.

The sending unit 320 is configured to send scheduling information to the M terminal nodes. The scheduling information is used to indicate the N transmission bandwidths and a correspondence, and the correspondence is the correspondence between the N transmission bandwidths and the N contention-based transmission time periods.

In this embodiment of the present application, the coordinator determines the correspondence between the contention-based transmission time periods and the transmission bandwidths based on the bandwidth information, so that when the terminal node transmits information in a contention-based transmission time period, the coordinator can receive information by using a corresponding bandwidth in the contention-based transmission time period. In addition, during downlink transmission, the terminal node can correctly detect downlink information based on the correspondence between the contention-based transmission time periods and the transmission bandwidths.

In addition, in this embodiment of the present application, a same transmission bandwidth or different transmission bandwidths may be set for different contention-based transmission time periods, so that during uplink communication contention, terminal nodes operating at different bandwidths perform transmission based on capabilities of the terminal nodes, thereby avoiding a waste of bandwidth resources caused by various terminal nodes using a minimum bandwidth for communication in the prior art.

Optionally, the N contention-based transmission time periods are N time periods in a contention access period CAP.

In the OWC network, when communication is performed based on a structure of a superframe, the coordinator may divide a part or all of the CAP into the N time periods, and may determine a sending bandwidth of the terminal node in each time period by determining the one-to-one correspondence between the N time periods and the N transmission bandwidths, to determine a receiving bandwidth.

Optionally, the N contention-based transmission time periods are N contention-based timeslots CBTSs in a Media Access Control MAC cycle.

In the OWC network, when communication is performed based on the MAC cycle, the coordinator may set a correspondence between the CBTSs and the transmission bandwidths. In this way, when the terminal node transmits information, the coordinator can know a sending bandwidth of the terminal node based on a time synchronized with that of the terminal node, to determine a receiving bandwidth.

Optionally, the sending unit 320 is specifically configured to send a beacon frame to the M terminal nodes. The beacon frame carries the scheduling information.

Optionally, the sending unit 320 is specifically configured to send a Media Access Plan MAP frame to the M terminal nodes. The MAP frame carries the scheduling information.

Optionally, the bandwidth information includes a maximum bandwidth supported by each of the M terminal nodes and/or a bandwidth currently used by each of the M terminal nodes.

Optionally, the bandwidth information further includes a maximum bandwidth supported by the coordinator and/or a bandwidth currently used by the coordinator.

Optionally, the N transmission bandwidths include a maximum bandwidth supported by each of the M terminal nodes, or the N bandwidths include a bandwidth currently used by each of the M terminal nodes.

Optionally, the N bandwidths further include a first bandwidth and/or a second bandwidth, the first bandwidth is a minimum bandwidth supported by a physical layer PHY mode, and the second bandwidth is a maximum bandwidth supported by the PHY mode.

Optionally, the determining unit 310 is specifically configured to determine the N contention-based transmission time periods based on a total traffic volume of the OWC network, a traffic volume of each of the M terminal nodes, and the bandwidth information.

Optionally, the sending unit 320 is further configured to send indication information to each of the M terminal nodes. The indication information is used to indicate the coordinator and each of the M terminal nodes to perform transmission based on the scheduling information in the N contention-based transmission time periods.

Optionally, when the N contention-based transmission time periods are the N time periods in the CAP, a time length $t(i)$ of an $i^{th}$ time period in the N time periods is:

$$t(i) = \frac{\Sigma M(i)}{M} t_{CAP1}, i = 1, 2, \cdots N,$$

where $\Sigma M(i)$ represents a quantity of terminal nodes, in the M terminal nodes, corresponding to a bandwidth $M(i)$ corresponding to the $i^{th}$ time period, and $t_{CAP1}$ represents a time length corresponding to a part or all of the CAP.

Optionally, the beacon frame may carry a start time and an end time of each of the N contention-based transmission time periods and a transmission bandwidth corresponding to each contention-based transmission time period.

Optionally, the beacon frame may alternatively carry a start time of each of the N contention-based transmission time periods, duration corresponding to each contention-based transmission time period, and a transmission bandwidth corresponding to each contention-based transmission time period.

The coordinator 300 in the OWC network according to this embodiment of the present application may correspond to the coordinator in the information transmission method in the OWC network in the embodiments of the present application. In addition, the units of the coordinator 300 and the foregoing other operations and/or functions are intended to implement the steps performed by the coordinator in FIG. 2. For brevity, details are not described herein again.

Figure 9:
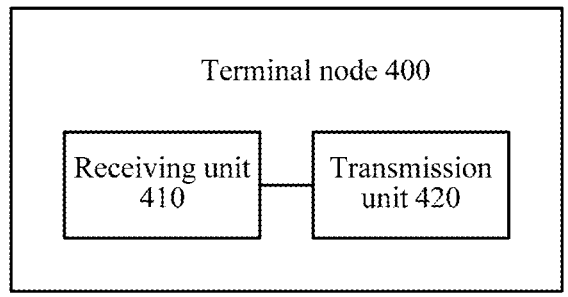
FIG. 9 is a schematic block diagram of a terminal node according to an embodiment of the present application.

FIG. 9 is a schematic block diagram of a terminal node 400 in an OWC network according to an embodiment of the present application. As shown in FIG. 9, the terminal node 400 includes a receiving unit 410 and a transmission unit 420.

The receiving unit 410 is configured to receive scheduling information sent by a coordinator. The scheduling information is used to indicate N transmission bandwidths and a correspondence, the correspondence is a correspondence between the N transmission bandwidths and N contention-based transmission time periods, the N transmission bandwidths are in a one-to-one correspondence with the N contention-based transmission time periods, and N is an integer greater than 1.

The transmission unit 420 is configured to perform information transmission with the coordinator in one or more of the N contention-based transmission time periods based on the scheduling information.

In this embodiment of the present application, the coordinator determines the correspondence between the contention-based transmission time periods and the transmission bandwidths, so that when the terminal node transmits information in a contention-based transmission time period, the coordinator can receive information by using a corresponding bandwidth in the contention-based transmission time period. In addition, during downlink transmission, the terminal node can correctly detect downlink information based on the correspondence between the contention-based transmission time periods and the transmission bandwidths.

In addition, in this embodiment of the present application, a same transmission bandwidth or different transmission bandwidths may be set for different contention-based transmission time periods, so that during uplink communication contention, terminal nodes operating at different bandwidths perform transmission based on capabilities of the terminal nodes, thereby avoiding a waste of bandwidth resources caused by various terminal nodes using a minimum bandwidth for communication in the prior art.

Optionally, the N contention-based transmission time periods are N time periods in a contention access period CAP.

Optionally, the N contention-based transmission time periods are N contention-based timeslots CBTSs in a Media Access Control MAC cycle.

Optionally, the receiving unit 410 is specifically configured to receive a beacon frame sent by the coordinator. The beacon frame carries the scheduling information.

Optionally, the receiving unit 410 is specifically configured to receive a Media Access Plan MAP frame sent by the coordinator. The MAP frame carries the scheduling information.

Optionally, the bandwidth information further includes a maximum bandwidth supported by the coordinator and/or a bandwidth currently used by the coordinator.

Optionally, the N transmission bandwidths include a maximum bandwidth supported by the terminal node and/or a bandwidth currently used by the terminal node.

Optionally, the N bandwidths further include a first bandwidth and/or a second bandwidth, the first bandwidth is a minimum bandwidth supported by a physical layer PHY mode, and the second bandwidth is a maximum bandwidth supported by the PHY mode.

Optionally, the N contention-based transmission time periods are determined by the coordinator based on a total traffic volume of the OWC network, a traffic volume of each of the M terminal nodes, and the bandwidth information.

Optionally, the receiving unit 410 is further configured to receive indication information sent by the coordinator. The indication information is used to indicate to perform transmission between the coordinator and the terminal node based on the scheduling information in the N contention-based transmission time periods.

Optionally, when the N contention-based transmission time periods are the N time periods in the CAP, a time length t(i) of an $i^{th}$ time period in the N time periods is:

$$t(i) = \frac{\Sigma M(i)}{M} t_{CAP1}, i = 1, 2, \cdots N,$$

where $\Sigma M(i)$ represents a quantity of terminal nodes, in the M terminal nodes, corresponding to a bandwidth M(i) corresponding to the $i^{th}$ time period, and $t_{CAP1}$ represents a time length corresponding to a part or all of the CAP.

Optionally, the beacon frame may carry a start time and an end time of each of the N contention-based transmission time periods and a transmission bandwidth corresponding to each contention-based transmission time period.

Optionally, the beacon frame may alternatively carry a start time of each of the N contention-based transmission time periods, duration corresponding to each contention-based transmission time period, and a transmission bandwidth corresponding to each contention-based transmission time period.

The terminal node 400 in the OWC network according to this embodiment of the present application may correspond to the terminal node in the information transmission method in the OWC network in the embodiments of the present application. In addition, the units of the terminal node 400 and the foregoing other operations and/or functions are intended to implement the steps performed by the terminal node in FIG. 2. For brevity, details are not described herein again.

Figure 10:
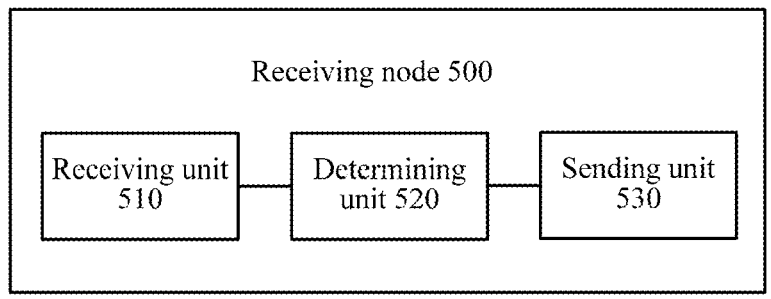
FIG. 10 is a schematic block diagram of a receiving node according to another embodiment of the present application.

FIG. 10 is a schematic block diagram of a receiving node 500 in an OWC network according to another embodiment of the present application. As shown in FIG. 10, the receiving node 500 includes a receiving unit 510, a determining unit 520, and a sending unit 530.

The receiving unit 510 is configured to receive a request to send RTS frame sent by a sending node by using a first bandwidth. The RTS frame includes first indication information.

The determining unit 520 is configured to determine a second bandwidth based on the first indication information. The second bandwidth is a sending bandwidth used when the sending node sends to-be-sent information and a receiving bandwidth used when the receiving node receives the to-be-sent information.

The sending unit 530 is configured to send a clear to send CTS frame to the sending node by using a third bandwidth.

In this embodiment of the present application, the receiving node may determine the second bandwidth by using the first indication information sent by the sending node, that is, the receiving bandwidth used when the receiving node receives the to-be-sent information subsequently sent by the sending node, so that the receiving node can correctly detect information (that is, the to-be-sent information) sent by the sending node. Specifically, during uplink communication, that is, when the receiving node is a coordinator, and the sending node is a terminal node, the coordinator can determine the second bandwidth based on the first indication information sent by the terminal node, so as to correctly detect uplink information (that is, the to-be-sent information) sent by the terminal node. During downlink communication, that is, when the receiving node is a terminal node and the sending node is a coordinator, the terminal node can determine the second bandwidth based on the first indication information sent by the coordinator, so as to correctly detect downlink information (that is, the to-be-sent information) sent by the coordinator.

In addition, in this embodiment of the present application, terminal nodes operating at different bandwidths may add different first indication information to the RTS frame. That is, the coordinator may determine, based on the first indication information, different receiving bandwidths corresponding to the different terminal nodes. In this way, during uplink transmission, each terminal node may use a transmission bandwidth different from a minimum bandwidth in the prior art, thereby avoiding a waste of bandwidth resources caused by various terminal nodes that use the minimum bandwidth for communication in the prior art.

Optionally, the first indication information includes the second bandwidth.

Optionally, the first indication information further includes bandwidth information, the bandwidth information indicates the receiving node to send the second bandwidth to the sending node, and the CTS frame carries the second bandwidth.

Optionally, the receiving unit 510 is further configured to receive, by using the second bandwidth, the to-be-sent information sent by the sending node.

Optionally, the sending unit 530 is further configured to send an acknowledgement ACK frame to the sending node by using a fourth bandwidth.

Optionally, the sending unit 530 is further configured to send second indication information to the sending node. The second indication information is used to indicate the receiving node and the sending node to use an RTS/CTS protocol in a contention-based transmission time period.

Optionally, the contention-based transmission time period is a time period in a contention access period CAP or a contention-based timeslot CBTS in a MAC cycle.

The receiving node 500 in the OWC network according to this embodiment of the present application may correspond to the receiving node in the information transmission method in the OWC network in the embodiments of the present application. In addition, the units of the receiving node 500 and the foregoing other operations and/or functions are intended to implement the steps performed by the coordinator in FIG. 6. For brevity, details are not described herein again.

Figure 11:
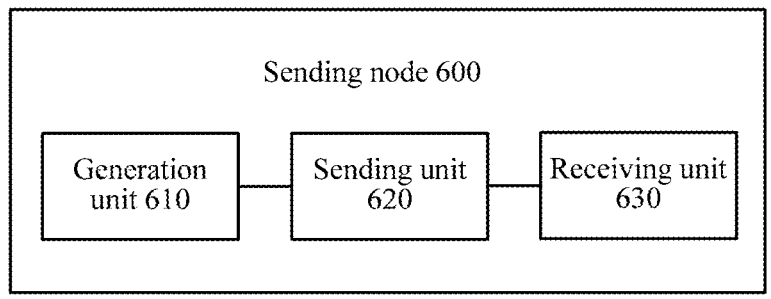
FIG. 11 is a schematic block diagram of a sending node according to another embodiment of the present application.

FIG. 11 is a schematic block diagram of a sending node 600 in an OWC network according to an embodiment of the present application. As shown in FIG. 11, the sending node 600 includes a generation unit 610, a sending unit 620, and a receiving unit 630.

The generation unit 610 is configured to generate a request to send RTS frame. The RTS frame includes first indication information.

The sending unit 620 is configured to send the RTS frame to a receiving node by using a first bandwidth. The first indication information is used by the receiving node to determine a second bandwidth, and the second bandwidth is a sending bandwidth used when the sending node sends to-be-sent information and a receiving bandwidth used when the receiving node receives the to-be-sent information.

The receiving unit 630 is configured to receive a clear to send CTS frame sent by the receiving node by using a third bandwidth.

In this embodiment of the present application, the receiving node may determine the second bandwidth by using the first indication information sent by the sending node, that is, the receiving bandwidth used when the receiving node receives the to-be-sent information subsequently sent by the sending node, so that the receiving node can correctly detect information (that is, the to-be-sent information) sent by the sending node. Specifically, during uplink communication, that is, when the receiving node is a coordinator, and the sending node is a terminal node, the coordinator can determine the second bandwidth based on the first indication information sent by the terminal node, so as to correctly detect uplink information (that is, the to-be-sent information) sent by the terminal node. During downlink communication, that is, when the receiving node is a terminal node and the sending node is a coordinator, the terminal node can determine the second bandwidth based on the first indication information sent by the coordinator, so as to correctly detect downlink information (that is, the to-be-sent information) sent by the coordinator.

In addition, in this embodiment of the present application, terminal nodes operating at different bandwidths may add different first indication information to the RTS frame. That is, the coordinator may determine, based on the first indication information, different receiving bandwidths corresponding to the different terminal nodes. In this way, during uplink transmission, each terminal node may use a transmission bandwidth different from a minimum bandwidth in the prior art, thereby avoiding a waste of bandwidth resources caused by various terminal nodes that use the minimum bandwidth for communication in the prior art.

Optionally, the first indication information includes the second bandwidth.

Optionally, the first indication information further includes bandwidth information, the bandwidth information indicates the receiving node to send the second bandwidth to the sending node, and the CTS frame carries the second bandwidth.

Optionally, the sending unit 620 is further configured to send the to-be-sent information to the receiving node by using the second bandwidth.

Optionally, the receiving unit 630 is further configured to receive an acknowledgement ACK frame sent by the receiving node by using a fourth bandwidth.

Optionally, the receiving unit 630 is further configured to receive second indication information sent by the receiving node. The second indication information is used to indicate the receiving node and the sending node to use an RTS/CTS protocol in a contention-based transmission time period.

Optionally, the contention-based transmission time period is a time period in a contention access period CAP or a contention-based timeslot CBTS in a MAC cycle.

The sending node 600 in the OWC network according to this embodiment of the present application may correspond to the sending node in the information transmission method in the OWC network in the embodiments of the present application. In addition, the units of the sending node 600 and the foregoing other operations and/or functions are intended to implement the steps performed by the terminal node in FIG. 6. For brevity, details are not described herein again.

Figure 12:
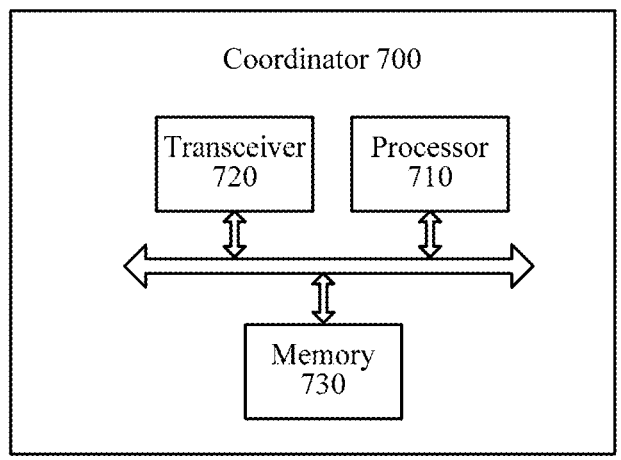
FIG. 12 is a schematic block diagram of a coordinator according to an embodiment of the present application.

FIG. 12 is a schematic structural block diagram of a coordinator 700 in an OWC network according to another embodiment of the present application. As shown in FIG. 12, the coordinator 700 includes a processor 710, a transceiver 720, and a memory 730. The memory 730 may be configured to store an instruction. The processor 710 is configured to execute the instruction stored in the memory 730. When executing the stored instruction, the processor 710 is configured to determine bandwidth information. The bandwidth information includes bandwidth information of each of M terminal nodes, the M terminal nodes are associated with the coordinator, and M is an integer greater than or equal to 1.

The processor 710 is further configured to: determine N contention-based transmission time periods, and determine, based on the bandwidth information, N transmission bandwidths in a one-to-one correspondence with the N contention-based transmission time periods, where N is an integer greater than 1.

The transceiver 720 is configured to send scheduling information to the M terminal nodes. The scheduling information is used to indicate the N transmission bandwidths and a correspondence, and the correspondence is the correspondence between the N transmission bandwidths and the N contention-based transmission time periods.

In this embodiment of the present application, the coordinator determines the correspondence between the contention-based transmission time periods and the transmission bandwidths based on the bandwidth information, so that when the terminal node transmits information in a contention-based transmission time period, the coordinator can receive information by using a corresponding bandwidth in the contention-based transmission time period. In addition, during downlink transmission, the terminal node can correctly detect downlink information based on the correspondence between the contention-based transmission time periods and the transmission bandwidths.

In addition, in this embodiment of the present application, a same transmission bandwidth or different transmission bandwidths may be set for different contention-based transmission time periods, so that during uplink communication contention, terminal nodes operating at different bandwidths perform transmission based on capabilities of the terminal nodes, thereby avoiding a waste of bandwidth resources caused by various terminal nodes using a minimum bandwidth for communication in the prior art.

Optionally, the N contention-based transmission time periods are N time periods in a contention access period CAP.

Optionally, the N contention-based transmission time periods are N contention-based timeslots CBTSs in a Media Access Control MAC cycle.

Optionally, the transceiver 720 is specifically configured to send a beacon frame to the M terminal nodes. The beacon frame carries the scheduling information.

Optionally, the transceiver 720 is specifically configured to send a Media Access Plan MAP frame to the M terminal nodes, where the MAP frame carries the scheduling information.

In a possible implementation, the bandwidth information includes a maximum bandwidth supported by each of the M terminal nodes and/or a bandwidth currently used by each of the M terminal nodes.

Optionally, the bandwidth information further includes a maximum bandwidth supported by the coordinator and/or a bandwidth currently used by the coordinator.

Optionally, the N transmission bandwidths include a maximum bandwidth supported by each of the M terminal nodes or a bandwidth currently used by each of the M terminal nodes.

Optionally, the N bandwidths further include a first bandwidth and/or a second bandwidth, the first bandwidth is a minimum bandwidth supported by a physical layer PHY mode, and the second bandwidth is a maximum bandwidth supported by the PHY mode.

Optionally, the processor 710 is specifically configured to determine the N contention-based transmission time periods based on a total traffic volume of the OWC network, a traffic volume of each of the M terminal nodes, and the bandwidth information.

Optionally, the transceiver 720 is further configured to send indication information to each of the M terminal nodes. The indication information is used to indicate the coordinator and each of the M terminal nodes to perform transmission based on the scheduling information in the N contention-based transmission time periods.

It should be understood that in this embodiment of the present application, the processor 710 may be a central processing unit (CPU), or the processor 710 may be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor or the processor may be any conventional processor or the like.

The memory 730 may include a read-only memory and a random access memory, and provide an instruction and data to the processor 710. A part of the processor 710 may further include a non-volatile random access memory. For example, the processor 710 may further store device type information.

In an implementation process, steps in the foregoing methods may be completed by using an integrated logical circuit of hardware in the processor 710 or instructions in a form of software in the processor 710. The steps of the information transmission method in the OWC network disclosed with reference to the embodiments of the present application may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 730, and the processor 710 reads information in the memory 730 and completes the steps in the foregoing methods in combination with hardware in the processor 710. To avoid repetition, details are not described herein again.

The coordinator 700 in the OWC network according to this embodiment of the present application may correspond to the coordinator in the information transmission method in the OWC network in the embodiments of the present application. In addition, the units of the coordinator 700 and the foregoing other operations and/or functions are intended to implement the steps performed by the coordinator in FIG. 2. For brevity, details are not described herein again.

Figure 13:
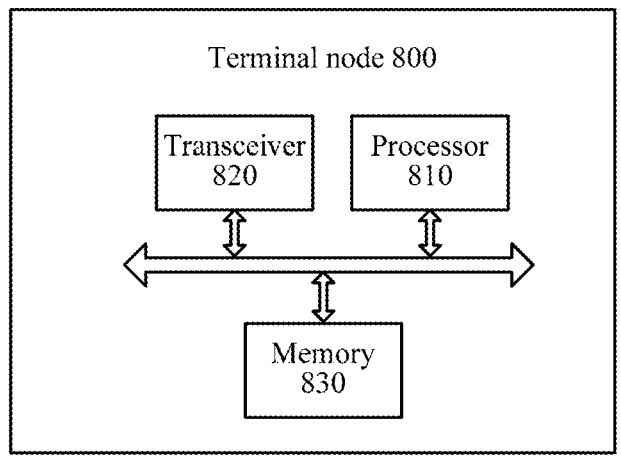
FIG. 13 is a schematic block diagram of a terminal node according to an embodiment of the present application.

FIG. 13 is a schematic block diagram of a terminal node 800 in an OWC network according to an embodiment of the present application. As shown in FIG. 13, the terminal node 800 includes a processor 810, a transceiver 820, and a memory 830. The memory 830 may be configured to store an instruction. The processor 810 is configured to execute the instruction stored in the memory 830. When executing the stored instruction, the transceiver 820 is configured to receive scheduling information sent by a coordinator. The scheduling information is used to indicate N transmission bandwidths and a correspondence, the correspondence is a correspondence between the N transmission bandwidths and N contention-based transmission time periods, the N transmission bandwidths are in a one-to-one correspondence with the N contention-based transmission time periods, and N is an integer greater than 1.

The transceiver 820 is further configured to perform information transmission with the coordinator in one or more of the N contention-based transmission time periods based on the scheduling information.

In this embodiment of the present application, the coordinator determines the correspondence between the contention-based transmission time periods and the transmission bandwidths, so that when the terminal node transmits information in a contention-based transmission time period, the coordinator can receive information by using a corresponding bandwidth in the contention-based transmission time period. In addition, during downlink transmission, the terminal node can correctly detect downlink information based on the correspondence between the contention-based transmission time periods and the transmission bandwidths.

In addition, in this embodiment of the present application, a same transmission bandwidth or different transmission bandwidths may be set for different contention-based transmission time periods, so that during uplink communication contention, terminal nodes operating at different bandwidths perform transmission based on capabilities of the terminal nodes, thereby avoiding a waste of bandwidth resources caused by various terminal nodes using a minimum bandwidth for communication in the prior art.

Optionally, the N contention-based transmission time periods are N time periods in a contention access period CAP.

Optionally, the N contention-based transmission time periods are N contention-based timeslots CBTSs in a Media Access Control MAC cycle.

Optionally, the transceiver 820 is specifically configured to receive a beacon frame sent by the coordinator. The beacon frame carries the scheduling information.

Optionally, the transceiver 820 is specifically configured to receive a Media Access Plan MAP frame sent by the coordinator. The MAP frame carries the scheduling information.

Optionally, the N transmission bandwidths include a maximum bandwidth supported by the terminal node and/or a bandwidth currently used by the terminal node.

Optionally, the N bandwidths further include a first bandwidth and/or a second bandwidth, the first bandwidth is a minimum bandwidth supported by a physical layer PHY mode, and the second bandwidth is a maximum bandwidth supported by the PHY mode.

Optionally, the N contention-based transmission time periods are determined by the coordinator based on a total traffic volume of the OWC network, a traffic volume of each of the M terminal nodes, and the bandwidth information.

Optionally, the transceiver 820 is further configured to receive indication information sent by the coordinator. The indication information is used to indicate to perform transmission between the coordinator and the terminal node based on the scheduling information in the N contention-based transmission time periods.

It should be understood that in this embodiment of the present application, the processor 810 may be a central processing unit (CPU), or the processor 810 may be another general-purpose processor, a (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor or the processor may be any conventional processor or the like.

The memory 830 may include a read-only memory and a random access memory, and provide an instruction and data to the processor 810. A part of the processor 810 may further include a non-volatile random access memory. For example, the processor 810 may further store device type information.

In an implementation process, steps in the foregoing methods may be completed by using an integrated logical circuit of hardware in the processor 810 or instructions in a form of software in the processor 810. The steps of the information transmission method in the OWC network disclosed with reference to the embodiments of the present application may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 830, and the processor 810 reads information in the memory 830 and completes the steps in the foregoing methods in combination with hardware in the processor 810. To avoid repetition, details are not described herein again.

The terminal node 800 in the OWC network according to this embodiment of the present application may correspond to the terminal node in the information transmission method in the OWC network in the embodiments of the present application. In addition, the units of the terminal node 800 and the foregoing other operations and/or functions are intended to implement the steps performed by the terminal node in FIG. 2. For brevity, details are not described herein again.

Figure 14:
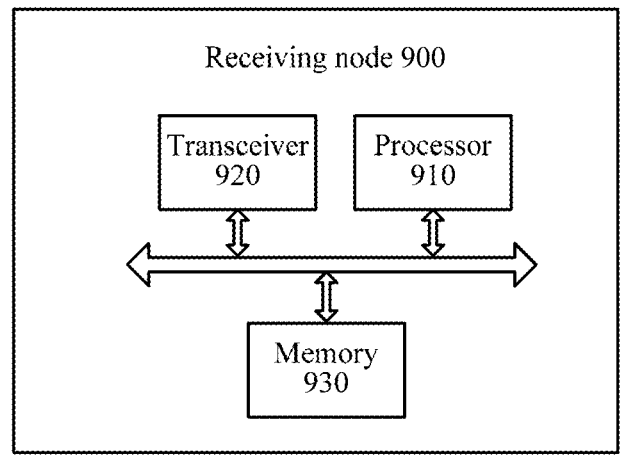
FIG. 14 is a schematic structural block diagram of a receiving node according to another embodiment of the present application.

FIG. 14 is a schematic block diagram of a receiving node 900 in an OWC network according to another embodiment of the present application. As shown in FIG. 14, the receiving node 900 includes a processor 910, a transceiver 920, and a memory 930. The memory 930 may be configured to store an instruction. The processor 910 is configured to execute the instruction stored in the memory 930. When executing the stored instruction, the transceiver 920 is configured to receive a request to send RTS frame sent by a sending node by using a first bandwidth. The RTS frame includes first indication information.

The processor 910 is configured to determine a second bandwidth based on the first indication information. The second bandwidth is a sending bandwidth used when the sending node sends to-be-sent information and a receiving bandwidth used when the receiving node receives the to-be-sent information.

The transceiver 920 is further configured to send a clear to send CTS frame to the sending node by using a third bandwidth.

In this embodiment of the present application, the receiving node may determine the second bandwidth by using the first indication information sent by the sending node, that is, the receiving bandwidth used when the receiving node receives the to-be-sent information subsequently sent by the sending node, so that the receiving node can correctly detect information (that is, the to-be-sent information) sent by the sending node. Specifically, during uplink communication, that is, when the receiving node is a coordinator, and the sending node is a terminal node, the coordinator can determine the second bandwidth based on the first indication information sent by the terminal node, so as to correctly detect uplink information (that is, the to-be-sent information) sent by the terminal node. During downlink communication, that is, when the receiving node is a terminal node and the sending node is a coordinator, the terminal node can determine the second bandwidth based on the first indication information sent by the coordinator, so as to correctly detect downlink information (that is, the to-be-sent information) sent by the coordinator.

In addition, in this embodiment of the present application, terminal nodes operating at different bandwidths may add different first indication information to the RTS frame. That is, the coordinator may determine, based on the first indication information, different receiving bandwidths corresponding to the different terminal nodes. In this way, during uplink transmission, each terminal node may use a transmission bandwidth different from a minimum bandwidth in the prior art, thereby avoiding a waste of bandwidth resources caused by various terminal nodes that use the minimum bandwidth for communication in the prior art.

Optionally, the first indication information includes the second bandwidth.

Optionally, the first indication information further includes bandwidth information, the bandwidth information indicates the receiving node to send the second bandwidth to the sending node, and the CTS frame carries the second bandwidth.

Optionally, the transceiver 920 is further configured to receive, by using the second bandwidth, the to-be-sent information sent by the sending node.

Optionally, the transceiver 920 is further configured to send an acknowledgement ACK frame to the sending node by using a fourth bandwidth.

Optionally, the transceiver 920 is further configured to send second indication information to the sending node. The second indication information is used to indicate the receiving node and the sending node to use an RTS/CTS protocol in a contention-based transmission time period.

Optionally, the contention-based transmission time period is a time period in a contention access period CAP or a contention-based timeslot CBTS in a MAC cycle.

It should be understood that in this embodiment of the present application, the processor 910 may be a central processing unit (CPU), or the processor 910 may be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor or the processor may be any conventional processor or the like.

The memory 930 may include a read-only memory and a random access memory, and provide an instruction and data to the processor 910. A part of the processor 910 may further include a non-volatile random access memory. For example, the processor 910 may further store device type information.

In an implementation process, steps in the foregoing methods may be completed by using an integrated logical circuit of hardware in the processor 910 or instructions in a form of software in the processor 910. The steps of the information transmission method in the OWC network disclosed with reference to the embodiments of the present application may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 930, and the processor 910 reads information in the memory 930 and completes the steps in the foregoing methods in combination with hardware in the processor 910. To avoid repetition, details are not described herein again.

The receiving node 900 in the OWC network according to this embodiment of the present application may correspond to the receiving node in the information transmission method in the OWC network in the embodiments of the present application. In addition, the units of the receiving node 900 and the foregoing other operations and/or functions are intended to implement the steps performed by the coordinator in FIG. 6. For brevity, details are not described herein again.

Figure 15:
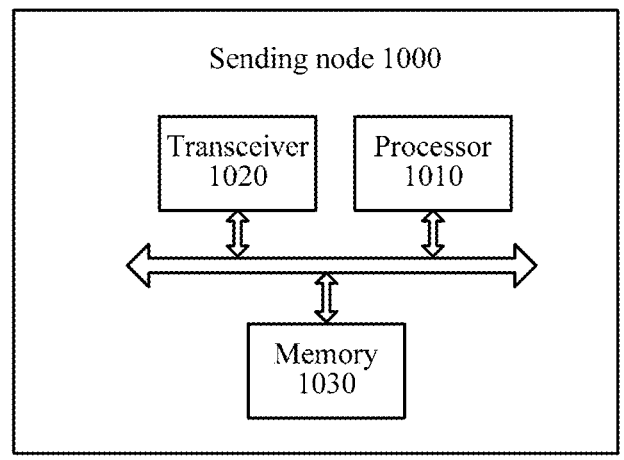
FIG. 15 is a schematic structural block diagram of a sending node according to another embodiment of the present application.

FIG. 15 is a schematic block diagram of a sending node 1000 in an OWC network according to an embodiment of the present application. As shown in FIG. 15, the sending node 1000 includes a processor 1010, a transceiver 1020, and a memory 1030. The memory 1030 may be configured to store an instruction. The processor 1010 is configured to execute the instruction stored in the memory 1030. When executing the stored instruction, the processor 1010 is configured to generate a request to send RTS frame. The RTS frame includes first indication information.

The transceiver 1020 is configured to send the RTS frame to a receiving node by using a first bandwidth. The first indication information is used by the receiving node to determine a second bandwidth, and the second bandwidth is a sending bandwidth used when the sending node sends to-be-sent information and a receiving bandwidth used when the receiving node receives the to-be-sent information.

The transceiver 1020 is further configured to receive a clear to send CTS frame sent by the receiving node by using a third bandwidth.

In this embodiment of the present application, the receiving node may determine the second bandwidth by using the first indication information sent by the sending node, that is, the receiving bandwidth used when the receiving node receives the to-be-sent information subsequently sent by the sending node, so that the receiving node can correctly detect information (that is, the to-be-sent information) sent by the sending node. Specifically, during uplink communication, that is, when the receiving node is a coordinator, and the sending node is a terminal node, the coordinator can determine the second bandwidth based on the first indication information sent by the terminal node, so as to correctly detect uplink information (that is, the to-be-sent information) sent by the terminal node. During downlink communication, that is, when the receiving node is a terminal node and the sending node is a coordinator, the terminal node can determine the second bandwidth based on the first indication information sent by the coordinator, so as to correctly detect downlink information (that is, the to-be-sent information) sent by the coordinator.

In addition, in this embodiment of the present application, terminal nodes operating at different bandwidths may add different first indication information to the RTS frame. That is, the coordinator may determine, based on the first indication information, different receiving bandwidths corresponding to the different terminal nodes. In this way, during uplink transmission, each terminal node may use a transmission bandwidth different from a minimum bandwidth in the prior art, thereby avoiding a waste of bandwidth resources caused by various terminal nodes that use the minimum bandwidth for communication in the prior art.

Optionally, the first indication information includes the second bandwidth.

Optionally, the first indication information further includes bandwidth information, the bandwidth information indicates the receiving node to send the second bandwidth to the sending node, and the CTS frame carries the second bandwidth.

Optionally, the transceiver 1020 is further configured to send the to-be-sent information to the receiving node by using the second bandwidth.

Optionally, the transceiver 1020 is further configured to receive an acknowledgement ACK frame sent by the receiving node by using a fourth bandwidth.

Optionally, the transceiver 1020 is further configured to receive second indication information sent by the receiving node. The second indication information is used to indicate the receiving node and the sending node to use an RTS/CTS protocol in a contention-based transmission time period.

Optionally, the contention-based transmission time period is a time period in a contention access period CAP or a contention-based timeslot CBTS in a MAC cycle.

It should be understood that in this embodiment of the present application, the processor 1010 may be a central processing unit (CPU), or the processor 1010 may be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor or the processor may be any conventional processor or the like.

The memory 1030 may include a read-only memory and a random access memory, and provide an instruction and data to the processor 1010. A part of the processor 1010 may further include a non-volatile random access memory. For example, the processor 1010 may further store device type information.

In an implementation process, steps in the foregoing methods may be completed by using an integrated logical circuit of hardware in the processor 1010 or instructions in a form of software in the processor 1010. The steps of the information transmission method in the OWC network disclosed with reference to the embodiments of the present application may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 1030, and the processor 1010 reads information in the memory 1030 and completes the steps in the foregoing methods in combination with hardware in the processor 1010. To avoid repetition, details are not described herein again.

The sending node 1000 in the OWC network according to this embodiment of the present application may correspond to the sending node in the information transmission method in the OWC network in the embodiments of the present application. In addition, the units of the sending node 1000 and the foregoing other operations and/or functions are intended to implement the steps performed by the terminal node in FIG. 6. For brevity, details are not described herein again.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present application. The foregoing storage medium includes any medium that can store program code, such as a USB flash drive, a removable hard disk, a read-only memory (ROM), a random access memory (RAM), a magnetic disk, or an optical disc.

The descriptions are only specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. An information transmission method in an optical wireless communications (OWC) network, the information transmission method comprising:
   generating, by a sending node, a request to send (RTS) frame comprising first indication information;
   sending, by the sending node, the RTS frame to a receiving node using a first bandwidth;
   receiving, by the sending node, a clear to send (CTS) frame from the receiving node using a third bandwidth, wherein the CTS frame from the receiving node comprises a second bandwidth determined by the receiving node according to the first indication information; and
   sending, by the sending node, to-be-sent information to the receiving node using the second bandwidth.

2. The information transmission method of claim 1, wherein the first indication information comprises information indicating the second bandwidth.

3. The information transmission method of claim 1, wherein the first indication information further comprises bandwidth information, and wherein the CTS frame carries information indicating the second bandwidth.

4. The information transmission method of claim 1, further comprising receiving, by the sending node, an acknowledgement frame from the receiving node using a fourth bandwidth.

5. The information transmission method of claim 1, wherein the sending node is a terminal node, wherein the receiving node is a coordinator, wherein before sending, by the sending node, the RTS frame to the receiving node using the first bandwidth, the information transmission method further comprises receiving, by the sending node, second indication information from the receiving node, and wherein the second indication information indicates to the sending node to use an RTS/CTS protocol in a contention-based transmission time period.

6. The information transmission method of claim 5, wherein the contention-based transmission time period is a time period in a contention access period (CAP) or a contention-based timeslot (CBTS) in a media access control (MAC) cycle.

7. The information transmission method of claim 5, wherein the contention-based transmission time period is a time period in a contention access period (CAP) in a media access control (MAC) cycle.

8. The information transmission method of claim 5, wherein the contention-based transmission time period is a contention-based timeslot (CBTS) in a media access control (MAC) cycle.

9. A receiving node in an optical wireless communications (OWC) network, comprising:
   a processor; and
   a memory coupled to the processor and storing instructions which, when executed by the processor, cause the receiving node to:
      receive a request to send (RTS) frame from a sending node using a first bandwidth, wherein the RTS frame comprises first indication information;
      determine a second bandwidth based on the first indication information;
      send a clear to send (CTS) frame to the sending node using a third bandwidth, wherein the CTS frame comprises the second bandwidth; and
      receive, using the second bandwidth, to-be-sent information sent by the sending node.

10. The receiving node of claim 9, wherein the first indication information comprises information indicating the second bandwidth.

11. The receiving node of claim 9, wherein the first indication information further comprises bandwidth information, and wherein the CTS frame carries information indicating the second bandwidth.

12. The receiving node of claim 9, wherein the instructions, when executed by the processor, further cause the receiving node to send an acknowledgement frame to the sending node using a fourth bandwidth.

13. The receiving node of claim 9, wherein the instructions, when executed by the processor, further cause the receiving node to send second indication information to the sending node, and wherein the second indication information indicates to the sending node to use an RTS/CTS protocol in a contention-based transmission time period.

14. The receiving node of claim 13, wherein the contention-based transmission time period is a time period in a contention access period (CAP) or a contention-based timeslot (CBTS) in a media access control (MAC) cycle.

15. A sending node in an optical wireless communications (OWC) network, the sending node comprising:
   a processor; and
   a memory coupled to the processor and storing instructions which, when executed by the processor, cause the sending node to:
      generate a request to send (RTS) frame comprising first indication information;
      send the RTS frame to a receiving node using a first bandwidth;
      receive a clear to send (CTS) frame from the receiving node using a third bandwidth, wherein the CTS frame from the receiving node comprises a second bandwidth determined by the receiving node according to the first indication information; and
      send to-be-sent information to the receiving node using the second bandwidth.

16. The sending node of claim 15, wherein the first indication information comprises information indicating the second bandwidth.

17. The sending node of claim 15, wherein the first indication information further comprises bandwidth information, and wherein the CTS frame carries information indicating the second bandwidth.

18. The sending node of claim 15, wherein the instructions, when executed by the processor, further cause the sending node to receive an acknowledgement frame from the receiving node using a fourth bandwidth.

19. The sending node of claim 15, wherein the instructions, when executed by the processor, further cause the sending node to receive second indication information from the receiving node, and wherein the second indication information indicates to the sending node to use an RTS/CTS protocol in a contention-based transmission time period.

20. The sending node of claim 19, wherein the contention-based transmission time period is a time period in a contention access period (CAP) or a contention-based timeslot (CBTS) in a media access control (MAC) cycle.

* * * * *

UNITED STATES PATENT AND TRADEMARK OFFICE
CERTIFICATE OF CORRECTION

PATENT NO. : 10,547,383 B2
APPLICATION NO. : 16/171997
DATED : January 28, 2020
INVENTOR(S) : Tong Jiang Page 1 of 1

It is certified that error appears in the above-identified patent and that said Letters Patent is hereby corrected as shown below:

On the Title Page

Page 2, Item (56), Other Publications, 2nd Column, Line 15: "15-15-0293-03-007a" should read "15-16-0016-00-007a"

Signed and Sealed this
Thirty-first Day of March, 2020

Andrei Iancu
*Director of the United States Patent and Trademark Office*